(12) United States Patent
Nammi et al.

(10) Patent No.: US 10,594,381 B2
(45) Date of Patent: *Mar. 17, 2020

(54) FACILITATION OF COMPUTATIONAL COMPLEXITY REDUCTION FOR PERIODIC AND APERIODIC CHANNEL STATE INFORMATION REPORTING IN 5G OR OTHER NEXT GENERATION NETWORK

(71) Applicant: AT&T Intellectual Property I, L.P., Atlanta, GA (US)

(72) Inventors: SaiRamesh Nammi, Austin, TX (US); Xiaoyi Wang, Austin, TX (US); Arunabha Ghosh, Austin, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/251,475

(22) Filed: Jan. 18, 2019

(65) Prior Publication Data

US 2019/0158167 A1 May 23, 2019

Related U.S. Application Data

(63) Continuation of application No. 15/424,313, filed on Feb. 3, 2017, now Pat. No. 10,205,504.

(51) Int. Cl.
*H04B 7/06* (2006.01)
*H04W 24/10* (2009.01)
*H04B 7/0456* (2017.01)

(52) U.S. Cl.
CPC ......... *H04B 7/0626* (2013.01); *H04B 7/0486* (2013.01); *H04B 7/0647* (2013.01); *H04W 24/10* (2013.01)

(58) Field of Classification Search
CPC .. H04B 7/0486; H04B 7/0626; H04B 7/0647; H04W 24/10
See application file for complete search history.

(56) References Cited

U.S. PATENT DOCUMENTS

| 8,155,098 B2 | 4/2012 | Huang et al. |
| 8,271,043 B2 | 9/2012 | Kim et al. |
| (Continued) | | |

FOREIGN PATENT DOCUMENTS

| EP | 1 730 864 A1 | 12/2006 |
| KR | 10-1512636 B1 | 4/2015 |
| (Continued) | | |

OTHER PUBLICATIONS

Non-Final Office Action received for U.S. Appl. No. 15/424,313 dated Jun. 11, 2018, 19 pages.

(Continued)

*Primary Examiner* — Gary Mui
(74) *Attorney, Agent, or Firm* — Amin, Turocy & Watson, LLP

(57) ABSTRACT

Using channel state information (CSI), e.g., rank information, precoding matrix index, etc., that is reported periodically by a user equipment, a complexity of reporting of aperiodic CSI reporting can be reduced, by reducing a search space of a codebook used for the aperiodic CSI reporting, when the UE is configured with periodic and aperiodic CSI reporting. A periodic configuration of a mobile device is facilitated for transmissions of channel state data periodically, and, in response to sending a reference signal, first channel state data of the channel is received according to the periodic configuration. Based on the first channel state data, an aperiodic configuration of the mobile device can be facilitated for transmissions of the channel state data aperiodically according to aperiodic requests received by the mobile device. Then, second channel state data can be (Continued)

received by the network device according to the aperiodic configuration.

20 Claims, 19 Drawing Sheets

(56) References Cited

U.S. PATENT DOCUMENTS

| | | | |
|---|---|---|---|
| 8,427,988 | B2 | 4/2013 | Pelletier et al. |
| 8,644,422 | B2 | 2/2014 | Gao et al. |
| 8,798,119 | B2 | 8/2014 | Grant et al. |
| 9,225,478 | B2 | 12/2015 | Chen et al. |
| 9,338,772 | B2 | 5/2016 | Etemad |
| 9,385,852 | B2 | 7/2016 | Hammarwall |
| 9,438,321 | B2 | 9/2016 | Novlan et al. |
| 2008/0285512 | A1 | 11/2008 | Pan et al. |
| 2013/0201912 | A1 | 8/2013 | Sheng et al. |
| 2013/0336214 | A1 | 12/2013 | Sayana et al. |
| 2014/0010126 | A1 | 1/2014 | Sayana et al. |
| 2014/0205031 | A1* | 7/2014 | Nammi ............... H04B 7/0413 375/267 |
| 2014/0355555 | A1 | 12/2014 | Han et al. |
| 2015/0282185 | A1 | 10/2015 | Nikopour et al. |
| 2016/0072562 | A1 | 3/2016 | Onggosanusi et al. |
| 2016/0127936 | A1 | 5/2016 | Chatterjee et al. |
| 2016/0142191 | A1 | 5/2016 | Davydov et al. |
| 2016/0301455 | A1 | 10/2016 | Nammi et al. |
| 2017/0019163 | A1 | 1/2017 | Yoshimoto et al. |
| 2017/0164226 | A1* | 6/2017 | Wei ...................... H04L 5/0023 |

FOREIGN PATENT DOCUMENTS

| | | |
|---|---|---|
| TW | I406580 B1 | 8/2013 |
| WO | 2008/123681 A1 | 10/2008 |
| WO | 2009/026400 A1 | 2/2009 |
| WO | 2016/164074 A1 | 10/2016 |

OTHER PUBLICATIONS

Tran et al., "Overview of Enabling Technologies for 3GPP LTE-Advanced," EURASIP Journal on Wireless Communications and Networking, 2012, vol. 54, 12 pages.

Becker, "Precoding and Spatially Multiplexed MIMO in 3GPP Long-Term Evolution," High Frequency Electronics, Oct. 2009, Summit Technical Media, LLC, 5 pages.

Ghaffar et al., "Multi-user MIMO in LTE and LTE-Advanced—Receiver Structure and Precoding Design," 2013, 30 Pages. http://cdn.intechopen.com/pdfs/45833.pdf. Retrieved on Feb. 14, 2017.

Lin et al., "Dual-Mode Low-Complexity Codebook Searching Algorithm and VLSI Architecture for LTE/LTE-Advanced Systems," IEEE Transactions on Signal Processing, Jul. 15, 2013, vol. 61, No. 14, pp. 3545-3562.

Chung et al., "Implementation of the Precoder Matrix Indicator Selection Using MMSE Trace Criterion for the Downlink Transmission in LTE," IEEE International Conference on Acoustics, Speech and Signal Processing (ICASSP), 2016, 5 pages.

* cited by examiner

FACILITATION OF COMPUTATIONAL COMPLEXITY REDUCTION FOR PERIODIC AND APERIODIC CHANNEL STATE INFORMATION REPORTING IN 5G OR OTHER NEXT GENERATION NETWORK

RELATED APPLICATION

The subject patent application is a continuation of, and claims priority to, U.S. patent application Ser. No. 15/424,313 (now U.S. Pat. No. 10,205,504), filed Feb. 3, 2017, and entitled "FACILITATION OF COMPUTATIONAL COMPLEXITY REDUCTION FOR PERIODIC AND APERIODIC CHANNEL STATE INFORMATION REPORTING IN 5G OR OTHER NEXT GENERATION NETWORK," the entirety of which application is hereby incorporated by reference herein

TECHNICAL FIELD

This disclosure relates generally to facilitating computational complexity reduction. For example, this disclosure relates to facilitating computational complexity reduction for a user equipment that employs periodic and aperiodic channel state information (CSI) reporting.

BACKGROUND

5th generation (5G) wireless systems represent a next major phase of mobile telecommunications standards beyond the current telecommunications standards of $4^{th}$ generation (4G). Rather than faster peak Internet connection speeds, 5G planning aims at higher capacity than current 4G, allowing higher number of mobile broadband users per area unit, and allowing consumption of higher or unlimited data quantities. This would enable a large portion of the population to stream high-definition media many hours per day with their mobile devices, when out of reach of wireless fidelity hotspots. 5G research and development also aims at improved support of machine-to-machine communication, also known as the Internet of things, aiming at lower cost, lower battery consumption and lower latency than 4G equipment.

The above-described background relating to facilitating computational complexity reduction at a user equipment device is merely intended to provide a contextual overview of some current issues, and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
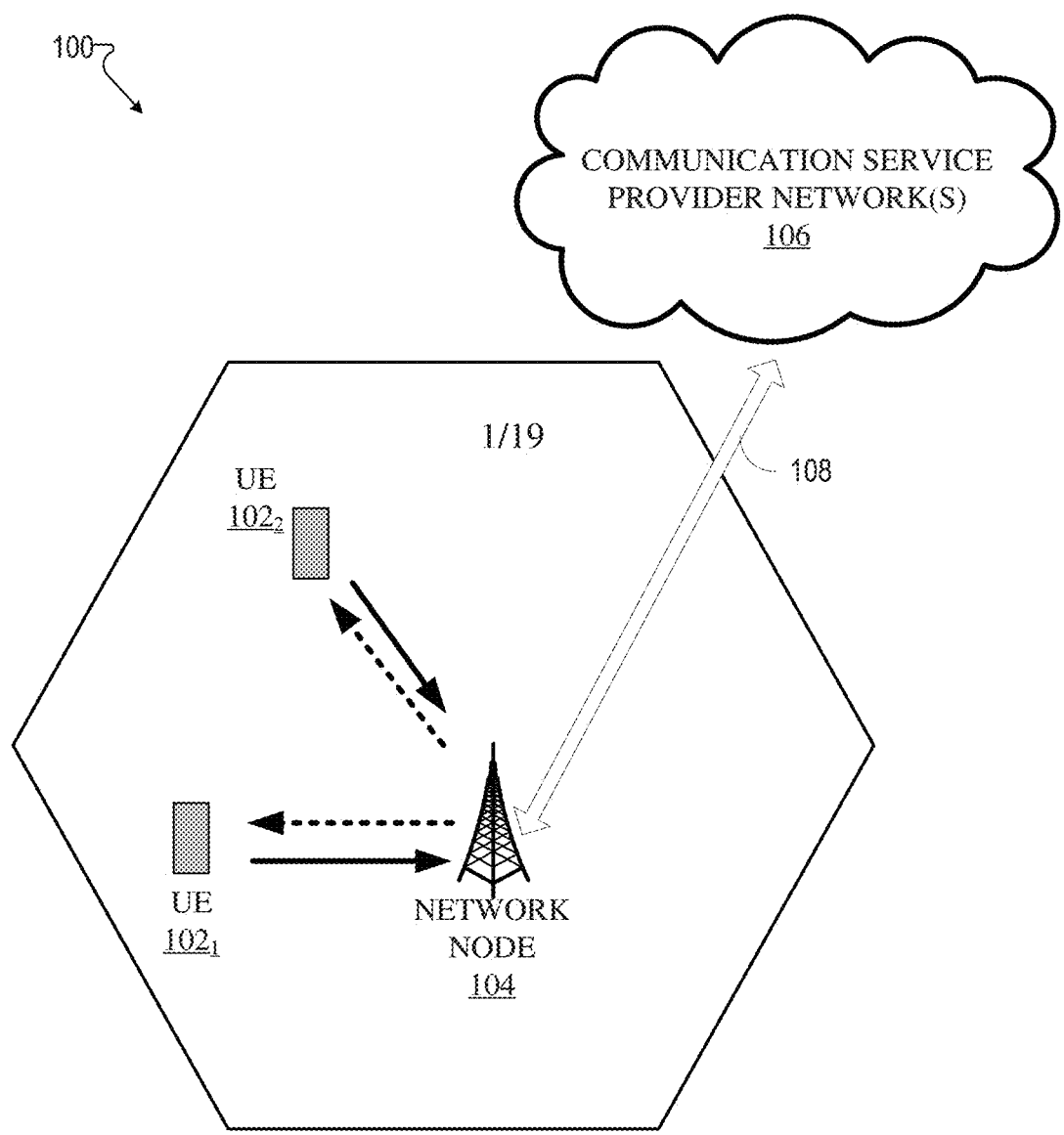
FIG. 1 illustrates an example wireless communication system in which a network node and user equipment (UE) can implement various aspects and embodiments of the subject disclosure.

In the following description, numerous specific details are set forth to provide a thorough understanding of various embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various machine-readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can comprise one or more processors therein to execute software and/or firmware that confer(s), at least in part, the functionality of the electronic components. In an aspect, a component can emulate an electronic component via a virtual machine, e.g., within a cloud computing system.

The words "exemplary" and/or "demonstrative" are used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

As used herein, the term "infer" or "inference" refers generally to the process of reasoning about, or inferring states of, the system, environment, user, and/or intent from a set of observations as captured via events and/or data. Captured data and events can comprise user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, or machine-readable media. For example, computer-readable media can comprise, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As an overview, various embodiments are described herein to facilitate computational complexity reduction for 5G or other next generation networks. For simplicity of explanation, the methods (or algorithms) are depicted and described as a series of acts. It is to be understood and appreciated that the various embodiments are not limited by the acts illustrated and/or by the order of acts. For example, acts can occur in various orders and/or concurrently, and with other acts not presented or described herein. Furthermore, not all illustrated acts may be required to implement the methods. In addition, the methods could alternatively be represented as a series of interrelated states via a state diagram or events. Additionally, the methods described hereafter are capable of being stored on an article of manufacture (e.g., a machine-readable storage medium) to facilitate transporting and transferring such methodologies to computers. The term article of manufacture, as used herein, is intended to encompass a computer program accessible from any computer-readable device, carrier, or media, comprising a non-transitory machine-readable storage medium.

It should be noted that although various aspects and embodiments have been described herein in the context of 5G, Universal Mobile Telecommunications System (UMTS), and/or Long Term Evolution (LTE), or other next generation networks, the disclosed aspects are not limited to 5G, a UMTS implementation, and/or an LTE implementation as the techniques can also be applied in 3G, 4G or LTE systems. For example, aspects or features of the disclosed embodiments can be exploited in substantially any wireless communication technology. Such wireless communication technologies can comprise UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

Described herein are systems, methods, articles of manufacture, and other embodiments or implementations that can facilitate computational complexity reduction for mobile devices that report channel state information periodically and aperiodically according to respective configurations in a 5G network (or other next generation network). Facilitating computational complexity reduction for a 5G network can be implemented in connection with any type of device with a connection to the communications network (e.g., a mobile handset, a computer, a handheld device, etc.) any Internet of things (TOT) device (e.g., toaster, coffee maker, blinds, music players, speakers, etc.), and/or any connected vehicles (cars, airplanes, space rockets, and/or other at least partially automated vehicles (e.g., drones)). In some embodiments the non-limiting term user equipment (UE) is used. It can refer to any type of wireless device that communicates with a radio network node in a cellular or mobile communication system. Examples of UE are target device, device to device (D2D) UE, machine type UE or UE capable of machine to machine (M2M) communication, PDA, Tablet, mobile terminals, smart phone, laptop embedded equipped (LEE), laptop mounted equipment (LME), USB dongles etc. Note that the terms element, elements and antenna ports can be interchangeably used but carry the same meaning in this disclosure. The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception.

In some embodiments, the non-limiting term radio network node or simply network node is used. It can refer to any type of network node that serves UE is connected to other network nodes or network elements or any radio node from where UE receives a signal. Examples of radio network nodes are Node B, base station (BS), multi-standard radio (MSR) node such as MSR BS, eNode B, network controller, radio network controller (RNC), base station controller (BSC), relay, donor node controlling relay, base transceiver station (BTS), access point (AP), transmission points, transmission nodes, RRU, RRH, nodes in distributed antenna system (DAS) etc.

Cloud radio access networks (RAN) can enable the implementation of concepts such as software-defined network (SDN) and network function virtualization (NFV) in 5G networks. This disclosure facilitates a generic channel state information framework design for a 5G network. Certain embodiments of this disclosure can comprise an SDN controller that can control routing of traffic within the network and between the network and traffic destinations. The SDN controller can be merged with the 5G network architecture to enable service deliveries via open application programming interfaces ("APIs") and move the network core towards an all internet protocol ("IP"), cloud based, and software driven telecommunications network. The SDN controller can work with, or take the place of policy and charging rules function ("PCRF") network elements so that policies such as quality of service and traffic management and routing can be synchronized and managed end to end.

To meet the huge demand for data centric applications, 4G standards can be applied 5G, also called new radio (NR) access. 5G networks can comprise the following: data rates of several tens of megabits per second supported for tens of thousands of users; 1 gigabit per second can be offered simultaneously to tens of workers on the same office floor; several hundreds of thousands of simultaneous connections can be supported for massive sensor deployments; spectral efficiency can be enhanced compared to 4G; improved coverage; enhanced signaling efficiency; and reduced latency compared to LTE. In multicarrier system such as OFDM, each subcarrier can occupy bandwidth (e.g., subcarrier spacing). If the carriers use the same bandwidth spacing, then it can be considered a single numerology. However, if the carriers occupy different bandwidth and/or spacing, then it can be considered a multiple numerology.

Downlink reference signals are predefined signals occupying specific resource elements within a downlink time-frequency grid. There are several types of downlink reference signals that can be transmitted in different ways and used for different purposes by a receiving terminal. Channel state information reference signals (CSI-RS) can be used by terminals to acquire channel-state information (CSI) and beam specific information (e.g., beam reference signal received power). In 5G, CSI-RS can be user equipment (UE) specific so it can have a significantly lower time/frequency density. Demodulation reference signals (DM-RS), also sometimes referred to as UE-specific reference signals, can be used by terminals for channel estimation of data channels. The label "UE-specific" relates to the each demodulation reference signal being intended for channel estimation by a single terminal. The demodulation reference signal can then be transmitted within the resource blocks assigned for data traffic channel transmission to that terminal. Other than the aforementioned reference signals, there are other reference signals, namely multi-cast broadcast single frequency network (MBSFN) and positioning reference signals that can be used for various purposes.

In 5G, a physical downlink control channel (PDCCH) can carry information about a scheduling grants. Typically, the information comprises of number of multiple input and multiple output (MIMO) layers scheduled, transport block sizes, modulation for each codeword, parameters related to hybrid automatic repeat requests (HARQ), and/or sub band locations. However, with DM-RS, there is no need to inform the selected precoding matrix, thereby saving a number of bits in the PDCCH.

Additionally, the uplink control channel can carry information about HARQ acknowledgment (ACK) corresponding to the downlink data transmission and channel state information. The channel state information can comprise rank information (RI), a channel quality indicator (CQI), and a precoding matrix index (PMI).

This disclosure relates to various embodiments, at a network node such as the gNode B, to reduce the complexity at the UE in finding CSI (e.g., rank information and precoding index) when the UE is configured with both periodic and aperiodic CSI reporting. The method can use the RI and/or PMI computed during the periodic reporting to reduce the search space in the codebook, thereby reducing the number of computations at the UE side for the aperiodic CSI reporting and vice versa.

The disclosed method can comprise advantages comprising: 1) the percentage degradation with respect to full search can be zero, while the complexity can be reduced; 2) battery life improvement at of the UE; and/or 3) the UE hardware resources (e.g., memory and processing units) can be partly relieved to allow the UE to efficiently execute additional procedures (e.g., inter-RAT measurements) in parallel to CSI estimation.

It is noted that although only a 4×4 MIMO system is considered for purposes of this disclosure, the disclosure is applicable for 8 TX, and in general for any Nt≥2 Tx system whereby the PMI and the RI estimation is required. The PMI can be defined as an index within a codebook or the PMI as a precoder itself depending on the context.

Rank information is a second order statistic of the channel and does not change quickly unlike a precoding matrix or CQI. For example, the plotted value of the rank reported by the UE for 100 CSI reports for various geometries (long term signal to noise ratios) showed that rank reported by the UE is generally constant or changes by either +1 or −1 for various speeds. This same trend is observed for medium Doppler (60 Km/h for 2.1 GHz carrier frequency). FIGS. 7-14 depict the instantaneous rank reported by the UE for geometry or long term signal interference to noise ratio (SINR) equal to −5, 0, 5, 10, 15, 20, 25 and 30 dB. In the above-noted cases, rank information does not change drastically, meaning that rank information does not go from 1 to 4 or 1 to 3, rather it changes slowly. More specifically, the rank information can change from 1 to 2, or 2 to 1, or 2 to 3, or 3 to 4, and vice versa (based on geometry).

Hence, rank information and the PMI reported for periodic reporting can be used as the input when finding the RI/PMI during aperiodic reporting. According to the proposed method, the UE can compute the CSI and send the CSI to the network node using periodic reporting. For the next aperiodic reporting, the network can inform the UE in computing the CSI based on the periodic reporting CSI. For instance, during the periodic CSI reporting, the rank can be reported as 3. Consequently, for aperiodic reporting, the network can indicate that the UE should select codebook elements corresponding to ranks equal to 3, 4 and/or 2 for computing the CSI. Thus, the network can assist the UE in reducing the CSI computational complexity for aperiodic CSI reporting.

In another embodiment, the network can indicate to the UE to use the same rank reported for periodic reporting for aperiodic reporting. Thus, the network can indicate what rank it is prefers to the UE as part of downlink control channel (dynamic signaling).

In another embodiment, the network can indicate that the UE should compute the CSI for aperiodic reporting based on periodic reporting rank, rank+1, rank−1 or rank using higher layer signaling (radio resource control (RRC)).

In yet another embodiment, the network can use the codebook subset restriction for setting the ranks for aperiodic CSI reporting. For this embodiment, two types of codebook subset restriction bit maps can be defined: 1) one for the periodic reporting; and 2) the other for aperiodic reporting. Hence the network can choose the bits in the bitmap for aperiodic reporting based on the reported periodic CSI reporting.

Ideal linear precoding can comprise full CSI at the transmitter, which can be possible for TDD based systems but not practical for FDD based systems. Codebook based precoding can allow the receiver to explicitly identify a precoding matrix/vector based on a codebook that should be used for transmission. As an example, in the 3GPP LTE standard, separate codebooks can be defined for various combinations of the number of transmit antennas and the number of transmission layers. The latter is also called rank information (RI). For example, total 64 precoding vectors and matrices are defined as shown in Table 1 for 4 transmit antennas. Also, for each rank in the codebook for the scenarios of RI=1, 2, 3 and 4, 16 elements per rank are defined.

TABLE 1

PMI codebook for 4 Tx antennas in LTE

| Codebook index | $u_n$ | Number of layers $\upsilon$ | | | |
|---|---|---|---|---|---|
| | | 1 | 2 | 3 | 4 |
| 0 | $u_0 = [1\ -1\ -1\ -1]^T$ | $W_0^{\{1\}}$ | $W_0^{\{14\}}/\sqrt{2}$ | $W_0^{\{124\}}/\sqrt{3}$ | $W_0^{\{1234\}}/2$ |
| 1 | $u_1 = [1\ -j\ 1\ j]^T$ | $W_1^{\{1\}}$ | $W_1^{\{12\}}/\sqrt{2}$ | $W_1^{\{123\}}/\sqrt{3}$ | $W_1^{\{1234\}}/2$ |
| 2 | $u_2 = [1\ 1\ -1\ 1]^T$ | $W_2^{\{1\}}$ | $W_2^{\{12\}}/\sqrt{2}$ | $W_2^{\{123\}}/\sqrt{3}$ | $W_2^{\{3214\}}/2$ |
| 3 | $u_3 = [1\ j\ 1\ -j]^T$ | $W_3^{\{1\}}$ | $W_3^{\{12\}}/\sqrt{2}$ | $W_3^{\{123\}}/\sqrt{3}$ | $W_3^{\{3214\}}/2$ |
| 4 | $u_4 = [1\ (-1-j)/\sqrt{2}\ -j\ (1-j)/\sqrt{2}]^T$ | $W_4^{\{1\}}$ | $W_4^{\{14\}}/\sqrt{2}$ | $W_4^{\{124\}}/\sqrt{3}$ | $W_4^{\{1234\}}/2$ |
| 5 | $u_5 = [1\ (1-j)/\sqrt{2}\ j\ (-1-j)/\sqrt{2}]^T$ | $W_5^{\{1\}}$ | $W_5^{\{14\}}/\sqrt{2}$ | $W_5^{\{124\}}/\sqrt{3}$ | $W_5^{\{1234\}}/2$ |
| 6 | $u_6 = [1\ (1+j)/\sqrt{2}\ -j\ (-1+j)/\sqrt{2}]^T$ | $W_6^{\{1\}}$ | $W_6^{\{13\}}/\sqrt{2}$ | $W_6^{\{134\}}/\sqrt{3}$ | $W_6^{\{1324\}}/2$ |
| 7 | $u_7 = [1\ (-1+j)/\sqrt{2}\ j\ (1+j)/\sqrt{2}]^T$ | $W_7^{\{1\}}$ | $W_7^{\{13\}}/\sqrt{2}$ | $W_7^{\{134\}}/\sqrt{3}$ | $W_7^{\{1324\}}/2$ |
| 8 | $u_8 = [1\ -1\ 1\ 1]^T$ | $W_8^{\{1\}}$ | $W_8^{\{12\}}/\sqrt{2}$ | $W_8^{\{124\}}/\sqrt{3}$ | $W_8^{\{1234\}}/2$ |
| 9 | $u_9 = [1\ -j\ -1\ -j]^T$ | $W_9^{\{1\}}$ | $W_9^{\{14\}}/\sqrt{2}$ | $W_9^{\{134\}}/\sqrt{3}$ | $W_9^{\{1234\}}/2$ |
| 10 | $u_{10} = [1\ 1\ 1\ -1]^T$ | $W_{10}^{\{1\}}$ | $W_{10}^{\{13\}}/\sqrt{2}$ | $W_{10}^{\{123\}}/\sqrt{3}$ | $W_{10}^{\{1324\}}/2$ |
| 11 | $u_{11} = [1\ j\ -1\ j]^T$ | $W_{11}^{\{1\}}$ | $W_{11}^{\{13\}}/\sqrt{2}$ | $W_{11}^{\{134\}}/\sqrt{3}$ | $W_{11}^{\{1324\}}/2$ |
| 12 | $u_{12} = [1\ -1\ -1\ 1]^T$ | $W_{12}^{\{1\}}$ | $W_{12}^{\{12\}}/\sqrt{2}$ | $W_{12}^{\{123\}}/\sqrt{3}$ | $W_{12}^{\{1234\}}/2$ |
| 13 | $u_{13} = [1\ -1\ 1\ -1]^T$ | $W_{13}^{\{1\}}$ | $W_{13}^{\{13\}}/\sqrt{2}$ | $W_{13}^{\{123\}}/\sqrt{3}$ | $W_{13}^{\{1324\}}/2$ |
| 14 | $u_{14} = [1\ 1\ -1\ -1]^T$ | $W_{14}^{\{1\}}$ | $W_{14}^{\{13\}}/\sqrt{2}$ | $W_{14}^{\{123\}}/\sqrt{3}$ | $W_{14}^{\{3214\}}/2$ |
| 15 | $u_{15} = [1\ 1\ 1\ 1]^T$ | $W_{15}^{\{1\}}$ | $W_{15}^{\{12\}}/\sqrt{2}$ | $W_{15}^{\{123\}}/\sqrt{3}$ | $W_{15}^{\{1234\}}/2$ |

$P_{PMI} = I_4 - (2u_{PMI}u_{PMI}^H/\|u_{PMI}\|^2)$, the precoding matrix $W_{PMI}$ for different ranks can be obtained by selecting/permuting the appropriate columns of matrix $P_{PMI}$ for the considered PMI.

The 3GPP standard does not specify what criteria the UE should use to compute the RI and/or the optimum precoding matrices/vectors. As mentioned in above, in closed-loop SM, the UE can estimate a suitable CSI, (e.g., CQI/PMI/RI) in order to maximize the throughput and simultaneously maintain the block-error-rate (BLER) constraint which can be mathematically described by a joint (integer) optimization problem.

$$\max_{CQI, PMI, RI} \text{Throughput}(CQI, PMI, RI) \qquad \text{Equation (1)}$$

$$\text{subject to } BLER \leq \text{Threshold}$$

Unfortunately, the joint (discrete/integer) optimization problem does not have any closed-form solution. Hence, one normally tries to estimate a suitable PMI/RI (independent of CQI); thereafter, a suitable CQI is estimated accordingly for the chosen PMI (and RI). For example, consider a single-cell scenario having perfect time and synchronization—a received system model for (closed-loop) SM per sub-carrier (post-FFT) can be shown as, $$Y = \underbrace{R_r^{\frac{1}{2}} H_{IID} R_t^{\frac{1}{2}}}_{H} W_{PMI} x + n \quad \text{Equation (2)}$$
$$= H W_{PMI} x + n,$$

where, $Y \in X^{N_r \times 1}$ corresponds to a received signal vector, and $H \in X^{N_r \times N_t}$ describes an overall channel matrix incorporating the receiver and transmitter spatial correlation $R_r \in P^{N_r \times N_r}$ and $R_t \in P^{N_t \times N_t}$, respectively. A complex zero-mean Gaussian noise vector $n \in C^{N_r \times 1}$ is having covariance $R_n$. An unknown complex data/symbol vector is denoted by $x \in A^{N_L \times 1}$ (having normalized power $E\{xx^H\} = R_x = I$) corresponding to M-QAM (e.g., 64-QAM) constellation Π. A (complex) precoder $W_{PMI} \in \Pi^{N_t \times N_L}$ is selected from a given/known codebook having $N_\Pi$ number of precoders (where, PMI={0, 1, ... $N_\Pi$−1}) for a given rank≤min{$N_r$, $N_t$}. The post-processing SINR per $i^{th}$ spatial layer for a given PMI, assuming linear-MMSE (minimum mean square error) detector employed at the receiver, reads $$SINR_i = \frac{1}{[(W_{PMI}^H H^H R_n^{-1} H W_{PMI} + I_{N_L})^{-1}]_{i,i}} - 1, \quad \text{Equation (3)}$$

where $[A]_{i,i}$ corresponds to an $i^{th}$ diagonal element of a matrix A. In order to estimate a suitable PMI/RI, a link-quality metric (LQM), (e.g., mean mutual information, denoted as mMI (per sub-band/wide-band)) is computed, as given below, $$mMI(PMI, RI) = \left(\frac{1}{K \cdot \text{rank}}\right) \sum_{k=1}^{K} \sum_{i=1}^{RI=\text{rank}} I(SINR_i[k]), \quad \text{Equation (4)}$$

where, $I(SINR_i[k])$ is mutual information that is a function of post-processing $SINR_i[k]$ (and modulation alphabet A) as given in Table 2 for $i^{th}$ spatial layer and $k^{th}$ resource-element. The number of resource-elements employed for the computation of the aforementioned LQM is given by a parameter K (depending on the wide-band/sub-band PMI estimate).

After having the estimate of mMI (per sub-band/wide-band), the PMI and RI can be jointly estimated by employing unconstrained optimization which can be given as, $$\max_{PMI, RI} mMI(PMI, RI). \quad \text{Equation (5)}$$

In one embodiment, described herein is a method comprising facilitating a first configuration of a mobile device of a wireless network for first transmissions of channel state data periodically, wherein the channel state data is associated with a channel employed by the mobile device for communications. In response to sending reference signal data associated with a reference signal to the mobile device, the method can comprise receiving first channel state data of the channel according to the first configuration. Additionally, based on the first channel state data, the method can comprise facilitating a second configuration of the mobile device for second transmissions of the channel state data aperiodically according to aperiodic requests for the channel state data received by the mobile device. Consequently, the method can comprise receiving second channel state data according to the second configuration.

According to another embodiment, a system can facilitate receiving periodically received channel state data according to a periodic reporting mode of a mobile device, wherein the periodically received channel state data comprises ranking information applicable to a channel of the mobile device used for communications. Based on the ranking information of the periodically received channel state data and an indication that the mobile device is to report in an aperiodic reporting mode, the system can facilitate sending selection data indicative of a group of vectors of a codebook data structure over which the mobile device is to search when selecting transmission parameters for operation according to the aperiodic reporting mode. Therefore, in response to sending reference signal data, associated with a reference signal, to the mobile device, the system can facilitate aperiodically receiving channel state data associated with the channel of the mobile device according to the aperiodic reporting mode of the mobile device, resulting in aperiodically received channel state data.

According to yet another embodiment, described herein is a machine-readable storage medium that can perform the operations comprising facilitating a first configuration of a mobile device for a first transmission of channel state data periodically, wherein the channel state data is associated with a channel employed by the mobile device for communications. The operations can also comprise sending pilot signal data, associated with a pilot signal, to the mobile

TABLE 2

Mutual information for 4-QAM, 16-QAM and 64-QAM.

| Modulation Alphabet A | Mutual Information per symbol |
|---|---|
| 4-QAM | $I(SINR_i) = J(\sqrt{4 \cdot SINR_i})$ |
| 16-QAM | $I(SINR_i) \approx (1/2)J(0.8818\sqrt{SINR_i}) + (1/4)J(1.6764\sqrt{SINR_i}) + (1/4)J(0.9316\sqrt{SINR_i})$ |
| 64-QAM | $I(SINR_i) \approx (1/3)J(1.1233\sqrt{SINR_i}) + (1/3)J(0.4381\sqrt{SINR_i}) + (1/3)J(0.4765\sqrt{SINR_i})$ |

$$J(a) \approx \begin{cases} -0.04210610 \, a^3 + 0.209252 \, a^2 - 0.00640081 \, a, & 0 < a < 1.6363 \\ 1 - \exp(0.00181491 \, a^3 - 0.142475 \, a^2 - 0.08220540 \, a + 0.0549608), & 1.6363 < a < \infty \end{cases}.$$

device, and in response to the sending of the pilot signal data, receiving first channel state data of the channel according to the first configuration. Based on the first channel state data, the operations can comprise facilitating a second configuration of the mobile device for a second transmission of the channel state data aperiodically according to an aperiodic request for the channel state data received by the mobile device. Consequently, the operations can comprise receiving second channel state data according to the second configuration.

These and other embodiments or implementations are described in more detail below with reference to the drawings.

FIG. 1 illustrates an example wireless communication system 100 in accordance with various aspects and embodiments of the subject disclosure. In example embodiments, system 100 is or comprises a wireless communication network serviced by one or more wireless communication network providers. In example embodiments, system 100 can comprise one or more user equipment (UEs) 102 (e.g., $102_1$, $102_2$ ... $102_n$), which can comprise one or more antenna panels comprising vertical and horizontal elements. A UE 102 can be any user equipment device, such as a mobile phone, a smartphone, a cellular enabled laptop (e.g., comprising a broadband adapter), a tablet computer, a wearable device, a virtual reality (VR) device, a heads-up display (HUD) device, a smart car, a machine-type communication (MTC) device, and the like. UE 102 can also comprise IOT devices that can communicate wirelessly. UE 102 roughly corresponds to the mobile station (MS) in global system for mobile communications (GSM) systems. Thus, the network node 104 (e.g., network node device) can provide connectivity between the UE and the wider cellular network and can facilitate wireless communication between the UE and the wireless communication network (e.g., the one or more communication service provider networks 106, described in more detail below) via a network node 104. The UE 102 can send and/or receive communication data wirelessly to the network node 104. The dashed arrow lines from the network node 104 to the UE 102 represent downlink (DL) communications and the solid arrow lines from the UE 102 to the network nodes 104 represent uplink (UL) communications.

The non-limiting term network node (e.g., network node device) can be used herein to refer to any type of network node serving a UE 102 and/or connected to other network nodes, network elements, or another network node from which the UE 102 can receive a radio signal. In typical cellular radio access networks (e.g., universal mobile telecommunications system (UMTS) networks), they can be referred to as base transceiver stations (BTS), radio base station, radio network nodes, base stations, Node B, eNode B (e.g., evolved Node B), etc.). In 5G terminology, the node can be referred to as a gNode B (e.g., gNB) device. Network nodes can also comprise multiple antennas for performing various transmission operations (e.g., MIMO operations). A network node can comprise a cabinet and other protected enclosures, an antenna mast, and actual antennas. Network nodes can serve several cells, also called sectors, depending on the configuration and type of antenna. Examples of network nodes (e.g., network node 104) can comprise but are not limited to: Node B devices, base station (BS) devices, access point (AP) devices, and radio access network (RAN) devices. The network node 104 can also comprise multi-standard radio (MSR) radio node devices, comprising: an MSR BS, an eNode B, a network controller, a radio network controller (RNC), a base station controller (BSC), a relay, a donor node controlling relay, a base transceiver station (BTS), a transmission point, a transmission node, an RRU, an RRH, nodes in distributed antenna system (DAS), and the like.

System 100 can further comprise one or more communication service provider networks 106 that facilitate providing wireless communication services to various UEs, comprising UE 102, via the network node 104 and/or various additional network devices (not shown) included in the one or more communication service provider networks 106. The one or more communication service provider networks 106 can comprise various types of disparate networks, comprising: cellular networks, femto networks, picocell networks, microcell networks, internet protocol (IP) networks Wi-Fi service networks, broadband service network, enterprise networks, cloud based networks, and the like. For example, in at least one implementation, system 100 can be or can comprise a large scale wireless communication network that spans various geographic areas. According to this implementation, the one or more communication service provider networks 106 can be or can comprise the wireless communication network and/or various additional devices and components of the wireless communication network (e.g., additional network devices and cells, additional UEs, network server devices, etc.). The network node 104 can be connected to the one or more communication service provider networks 106 via one or more backhaul links 108. For example, the one or more backhaul links 108 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 108 can also comprise wireless link components, such as but not limited to, line-of-sight (LOS) or non-LOS links which can comprise terrestrial air-interfaces or deep space links (e.g., satellite communication links for navigation).

In one technique, the UE 102 can send a reference signal back to the network node 104. The network node 104 takes a received reference signal from the UE 102, estimates the condition of the channel, which can be influenced by various factors, such as objects in the line of sight, weather, movement, interference, etc., and after correcting for more issues (e.g., interference), adjusts the beamforming rates for each antenna transmitting to the UE 102, and changes parameters, so as to transmit a better beam toward the UE 102. This ability to select MIMO schemes and use beamforming to focus energy and adapt to changing channel conditions can allow for higher data rates.

Figure 2:
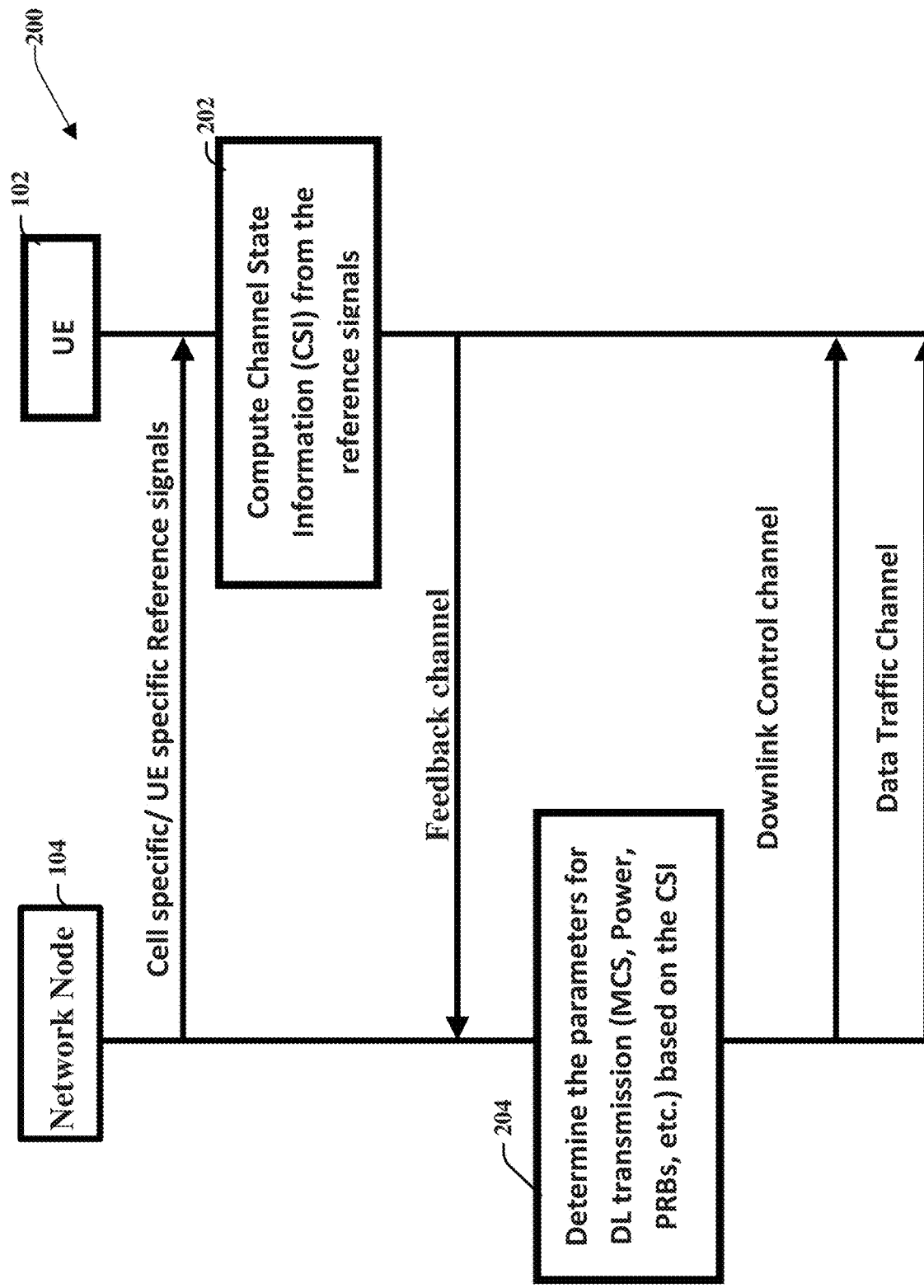
FIG. 2 illustrates an example schematic system block diagram of a message sequence chart between a network node and user equipment according to one or more embodiments.

Referring now to FIG. 2, illustrated is an example schematic system block diagram of a message sequence chart between a network node and user equipment according to one or more embodiments. FIG. 2 depicts a message sequence chart for downlink data transfer in 5G systems 200. The network node 104 can transmit reference signals to a user equipment (UE) 102. The reference signals can be cell specific and/or user equipment 102 specific in relation to a profile of the user equipment 102 or some type of mobile identifier. From the reference signals, the user equipment 102 can compute channel state information (CSI) and compute parameters used for a CSI report at block 202. The CSI report can comprise: a channel quality indicator (CQI), a pre-coding matrix index (PMI), rank information (RI), a CSI-resource indicator (e.g., CRI the same as beam indicator), etc.

The user equipment 102 can then transmit the CSI report to the network node 104 via a feedback channel either on request from the network node 104, a-periodically, and/or periodically. A network scheduler can leverage the CSI report to determine downlink transmission scheduling parameters at 204, which are particular to the user equipment 102. The scheduling parameters 204 can comprise modulation and coding schemes (MCS), power, physical resource blocks (PRBs), etc. FIG. 2 depicts the physical layer signaling where the density change can be reported for the physical layer signaling or as a part of the radio resource control (RRC) signaling. In the physical layer, the density can be adjusted by the network node 104 and then sent over to the user equipment 102 as a part of the downlink control channel data. The network node 104 can transmit the scheduling parameters, comprising the adjusted densities, to the user equipment 102 via the downlink control channel. Thereafter and/or simultaneously, data can be transferred, via a data traffic channel, from the network node 104 to the user equipment 102.

Figure 3:
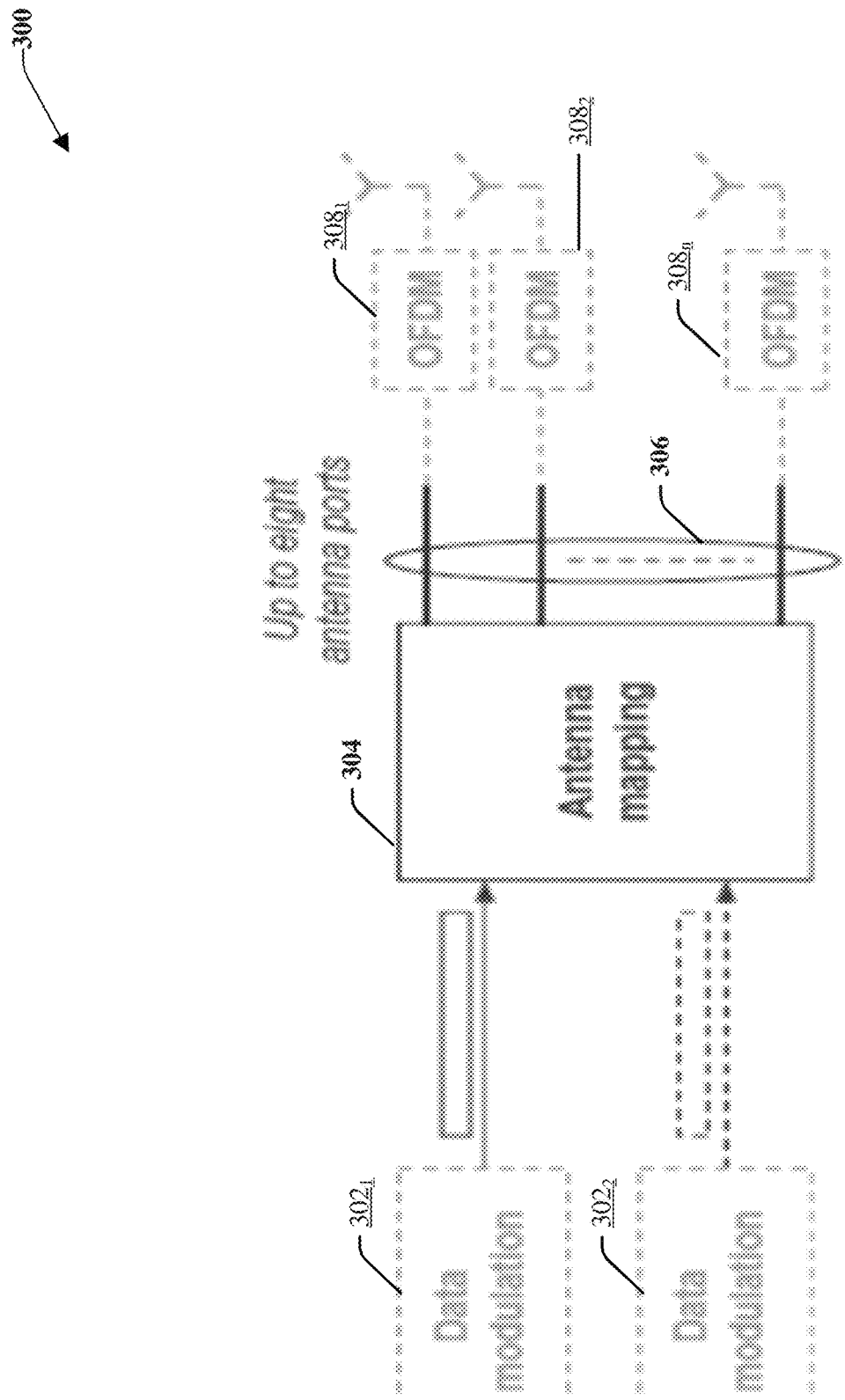
FIG. 3 illustrates an example schematic system block diagram of a 4G MIMO transmission using up to two code words of encoded data, mapped to up to eight antenna ports according to one or more embodiments.

Referring now to FIG. 3, illustrated is an example schematic system block diagram of a 4G MIMO transmission using up to two code words of encoded data, mapped to up to eight antenna ports according to one or more embodiments. A similar structure can be used for 5G systems with more antenna ports. Antenna mapping 304 in general, can be described as a mapping from the output of a data modulation $302_1$, $302_2$ to the different antenna ports 306. The input to the antenna mapping 304 can comprise modulation symbols (QPSK, 16QAM, 64QAM, 256QAM) corresponding to the one or two transport blocks. To be more specific, there can be one transport block per transmit time interval (TTI) except for spatial multiplexing, in which case there can be up to two transport blocks per TTI. The output of the antenna mapping can be a set of symbols for each antenna port. The symbols of each antenna port can be subsequently applied to the OFDM modulator $308_1$, $308_2$ ... $308_n$ (e.g., mapped to the basic OFDM time-frequency grid corresponding to that antenna port).

Figure 4:
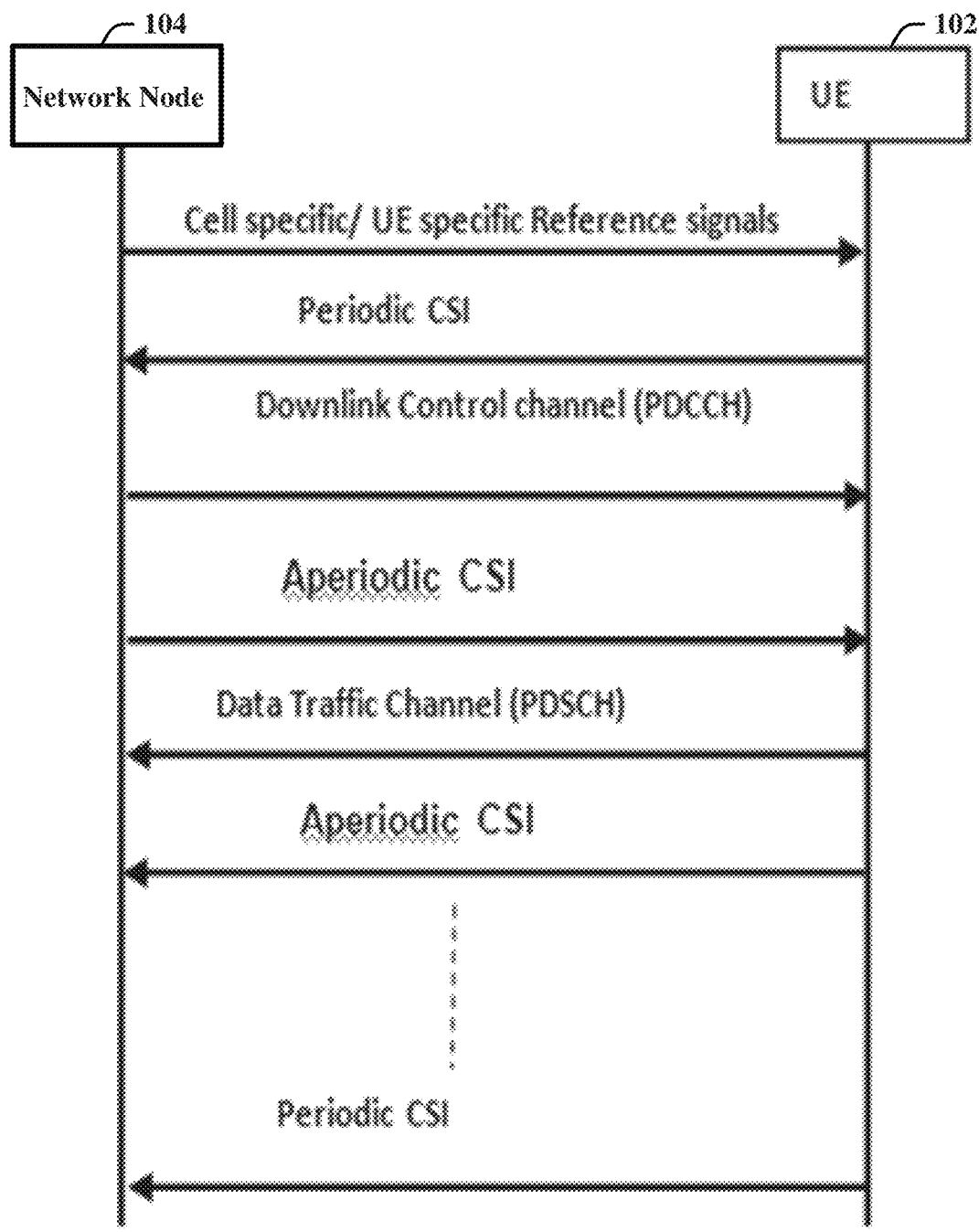
FIG. 4 illustrates an example schematic system block diagram of a message sequence chart between the network (e.g., gNode B) and the UE with periodic and aperiodic CSI according to one or more embodiments.

Referring now to FIG. 4, illustrated is an example schematic system block diagram of a message sequence chart between the network (e.g., gNode B) and the UE with periodic and aperiodic CSI according to one or more embodiments. The network node 104 can configure the UE 102 to send CSI either periodically or on an on demand (aperiodic) basis. It can be beneficial to configure the UE with both types of CSI reporting for whole band or sub band. FIG. 2 depict a message sequence chart for downlink data transfer in a NR closed loop system. From the pilot or reference signals, the UE can compute the channel estimates and compute the parameters used for CSI reporting. The CSI report can comprise a channel quality indicator (CQI), a precoding matrix index (PMI), rank information (RI), etc. Thus, the periodic CSI report can comprise CSI computed over the whole bandwidth, which may not represent a sub band CSI. Consequently the network node 104 can demand sub band CSI via a downlink control channel. In this case, the UE 102 can report the CSI aperiodically using one or more embodiments described herein. Once the network node 104 receives this information, it can schedule the UE 103 with either sub band scheduling or with wideband scheduling.

Figure 5:
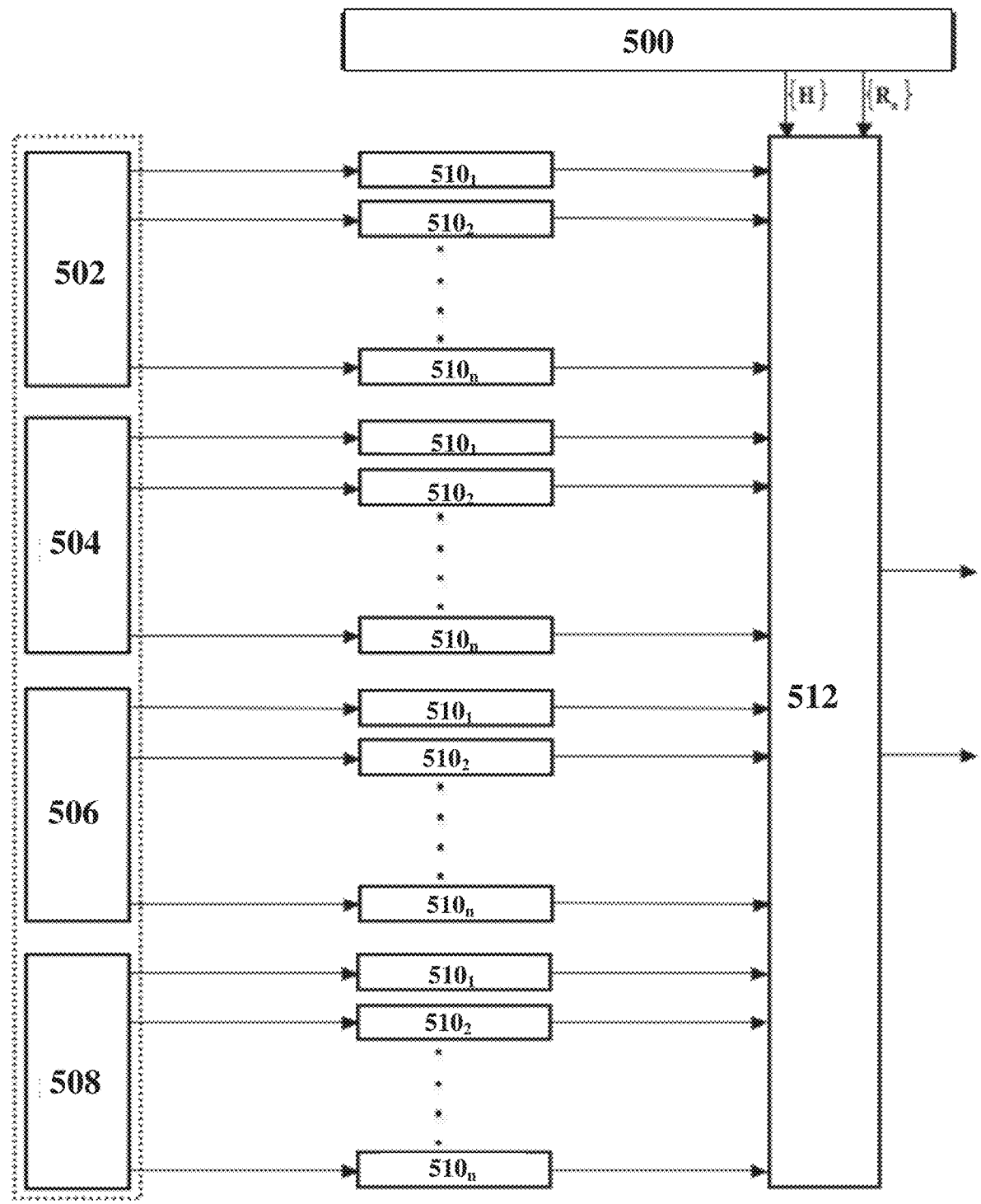
FIG. 5 illustrates an example schematic system block diagram of an exhaustive PMI and RI search for 4×4 MIMO in LTE/LTE-A systems according to one or more embodiments.

Referring now to FIG. 5 illustrates an example schematic system block diagram of an exhaustive PMI and RI search for 4×4 MIMO in LTE/LTE-A systems according to one or more embodiments. FIG. 5 depicts how the PMI and RI are computed based on the mutual information approach. Thus, with the chosen PMI/RI, the CQI can be computed afterwards. For example rank hypothesis 502, 504, 506, 508 can be sent to several corresponding PMI hypothesis $510_1$, $510_2$ ... $510_n$. Thereafter, data from the corresponding PMI hypothesis $510_1$, $510_2$ ... $510_n$ can be sent and received by block 512. Block 512 can also receive channel estimates, noise covariance estimates and other channel parameters from block 500, whereby block 512 can generate joint PMI and RI estimations. Thereafter, a PMI estimate and a RI estimate can be output by block 512

Figure 6:
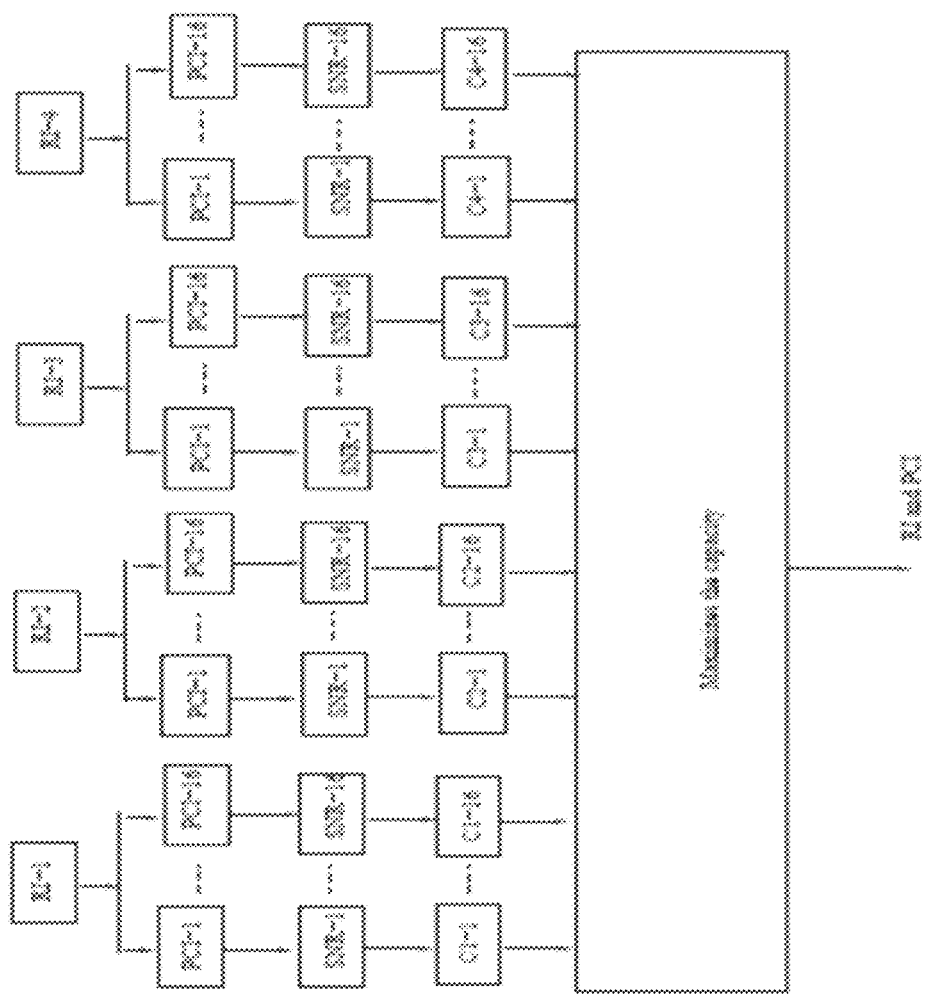
FIG. 6 illustrates an example schematic system block diagram of a pictorial view of PMI/RI selection in a conventional selection using a capacity approach according to one or more embodiments.

Referring now to FIG. 6, illustrated is an example schematic system block diagram of an example pictorial view of PMI/RI selection during conventional selection using a capacity approach according to one or more embodiments. Leveraging the capacity approach can yield RI and PMI for a 4 transmit antenna system 600. Thus the received SINR at the output of the MIMO detector (MMSE, MLD, etc.) is a function of the channel matrix H, precoding matrix, the noise power spectral density and the co-channel interference power. For example, the UE 102 can estimate the channel via signal data and/or pilot data. The UE 102 can then compute the post-processing SINR for each entity in the precoding codebook. Furthermore, the UE 102 can compute the LQMs via either the capacity approach or mutual-information approach for each entity using the aforementioned Equation 4 or Equation 6 below.

$$\text{capacity}(PMI, RI) = \left(\frac{1}{K \cdot \text{rank}}\right) \sum_{k=1}^{K} \sum_{i=1}^{RI=rank} \log_2(1 + SINR_i[k]). \qquad \text{Equation (6)}$$

Consequently, the precoding control index and the corresponding RI can be determined, and use to maximize the LQM.

Figure 7:
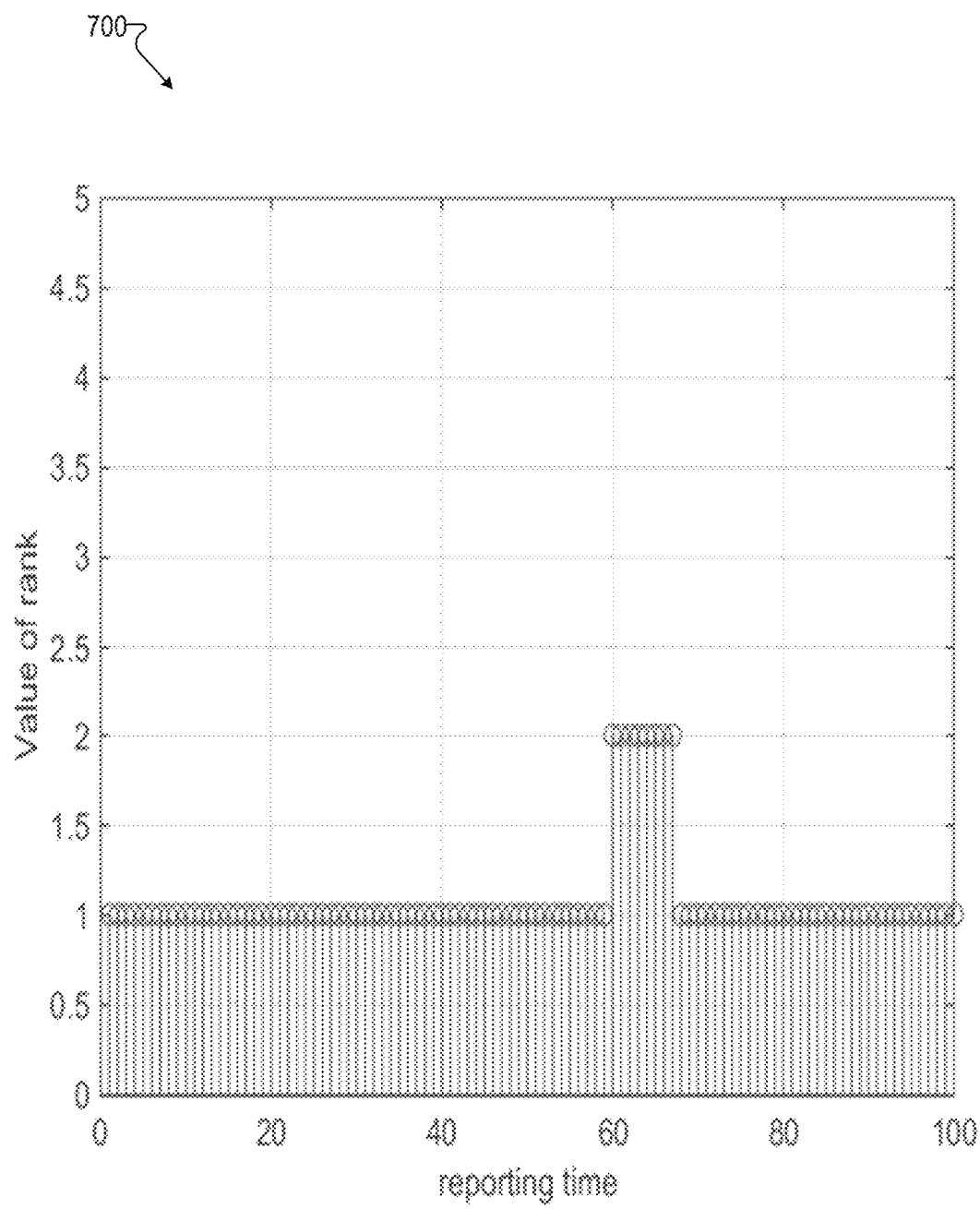
FIG. 7 illustrates an example graph of an instantaneous RI at geometry equal to −5 dB according to one or more embodiments.
Figure 8:
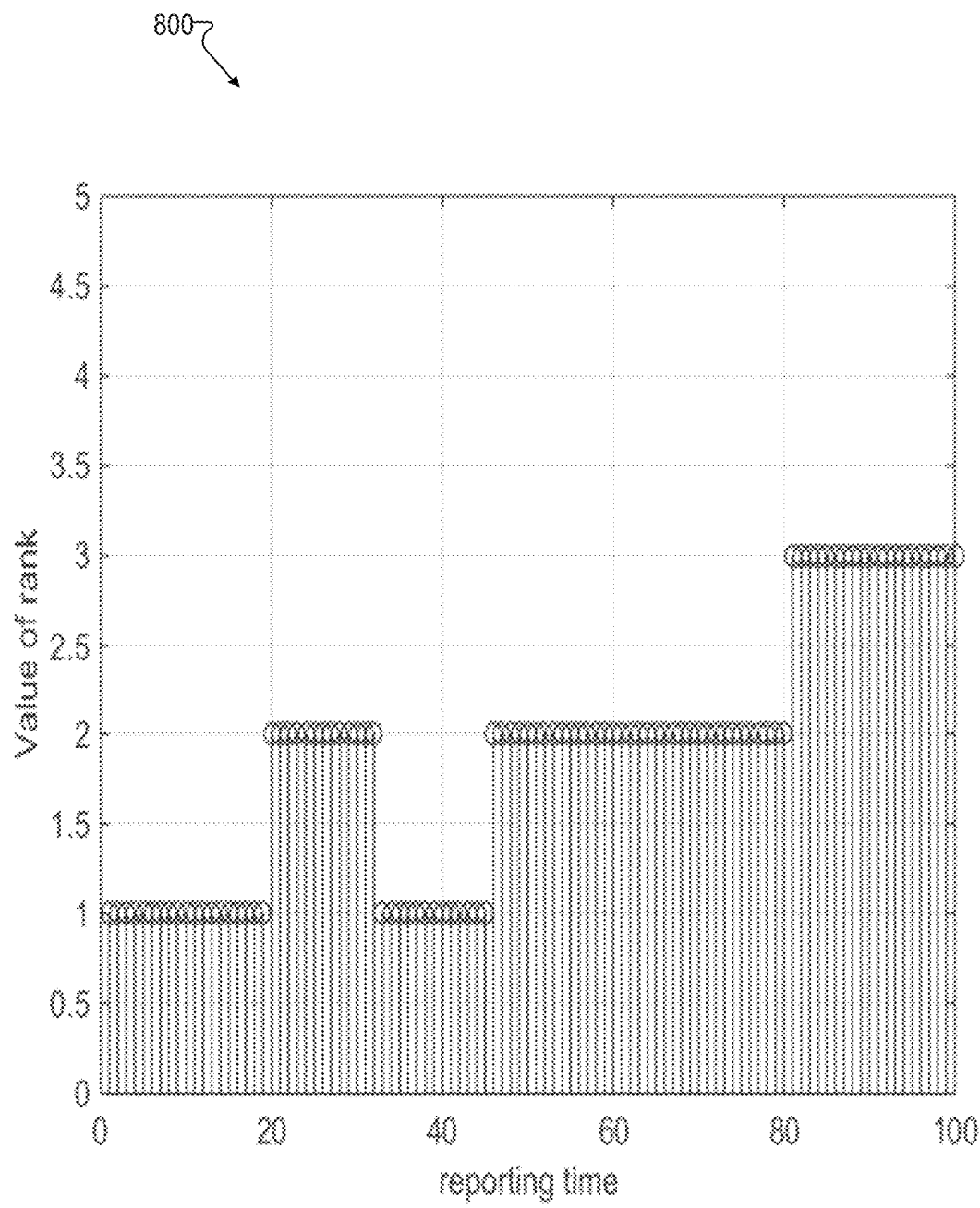
FIG. 8 illustrates an example graph of an instantaneous RI at geometry equal to 0 dB according to one or more embodiments.
Figure 9:
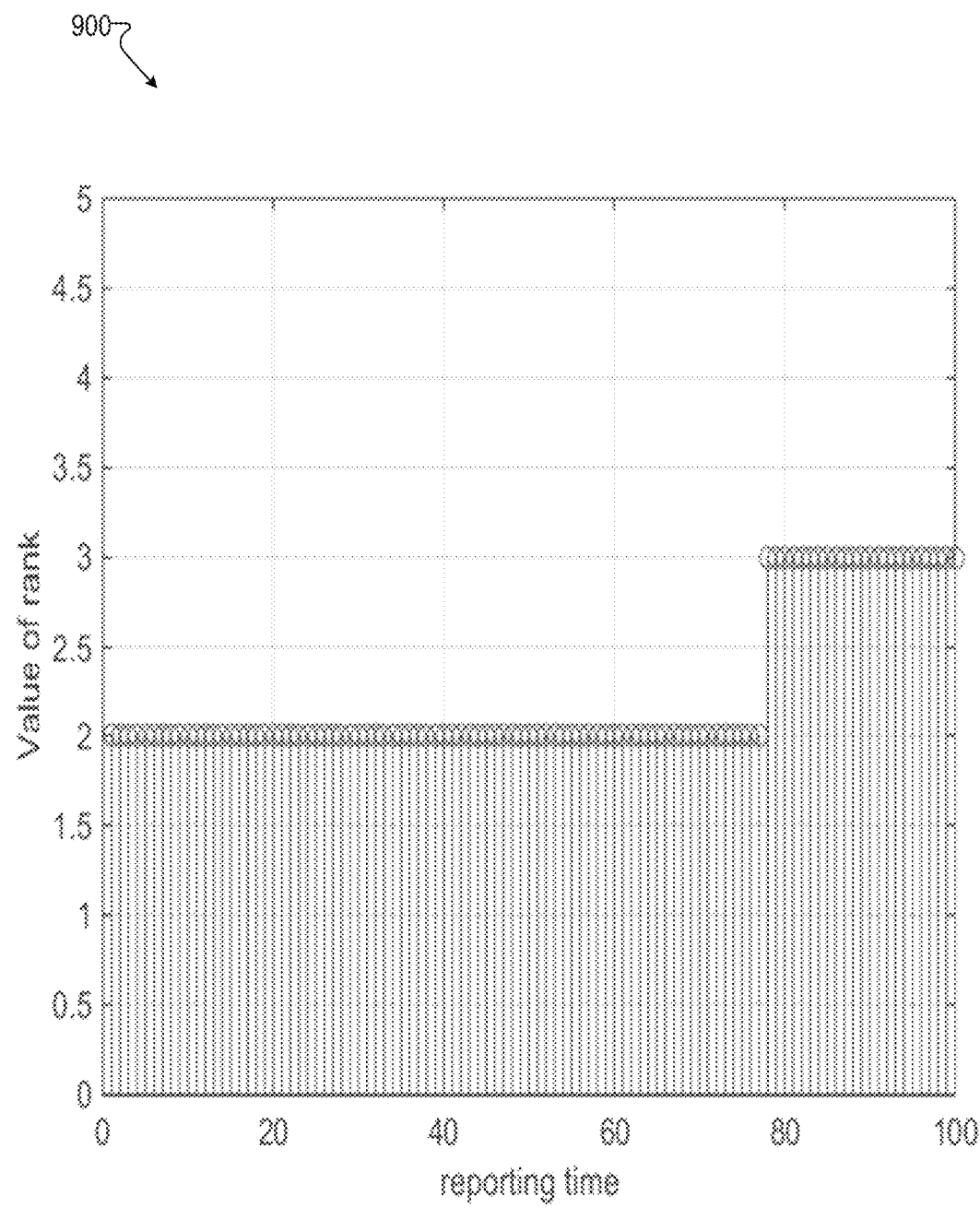
FIG. 9 illustrates an example graph of an instantaneous RI at geometry equal to 5 dB according to one or more embodiments.
Figure 10:
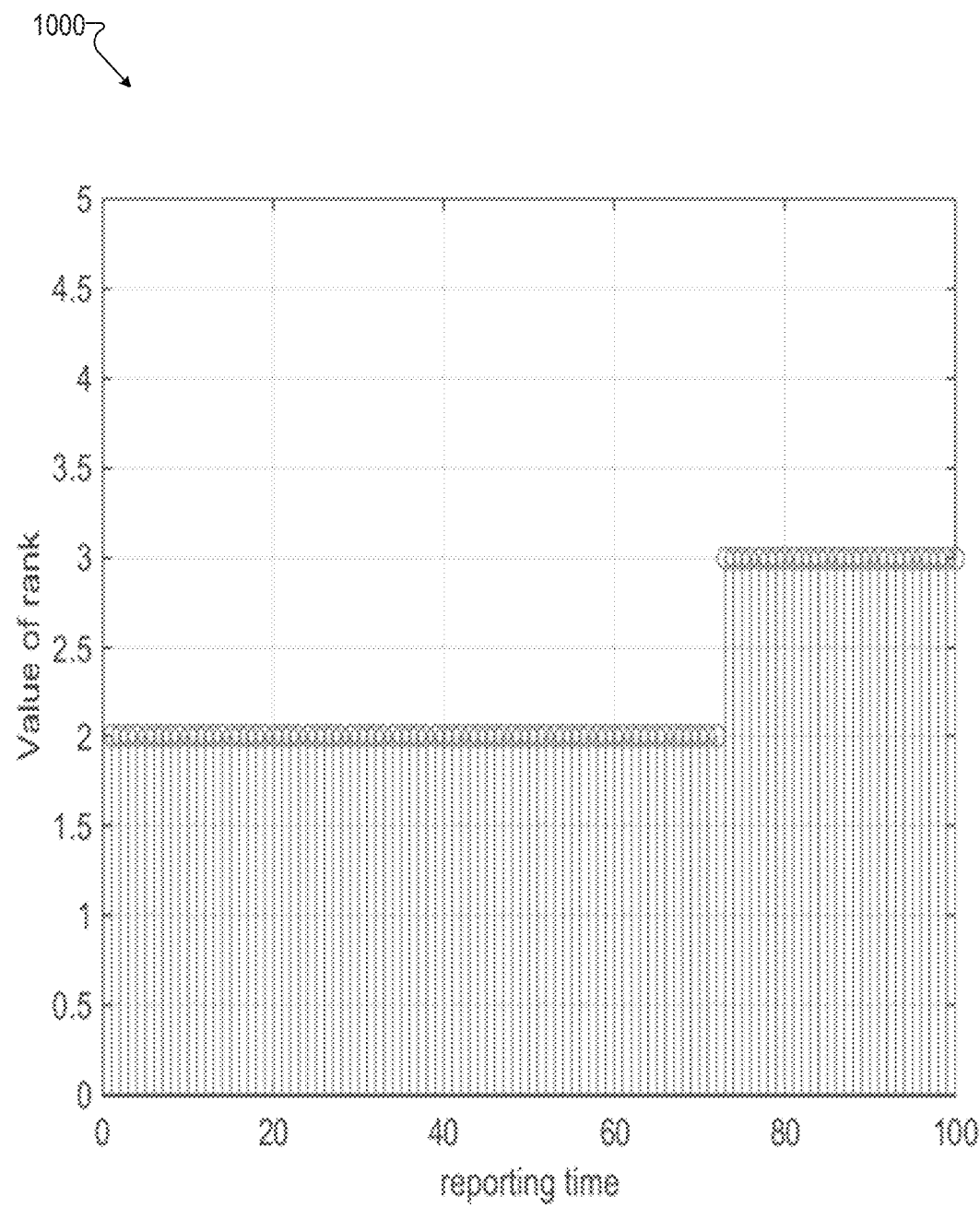
FIG. 10 illustrates an example graph of an instantaneous RI at geometry equal to 10 dB according to one or more embodiments.
Figure 11:
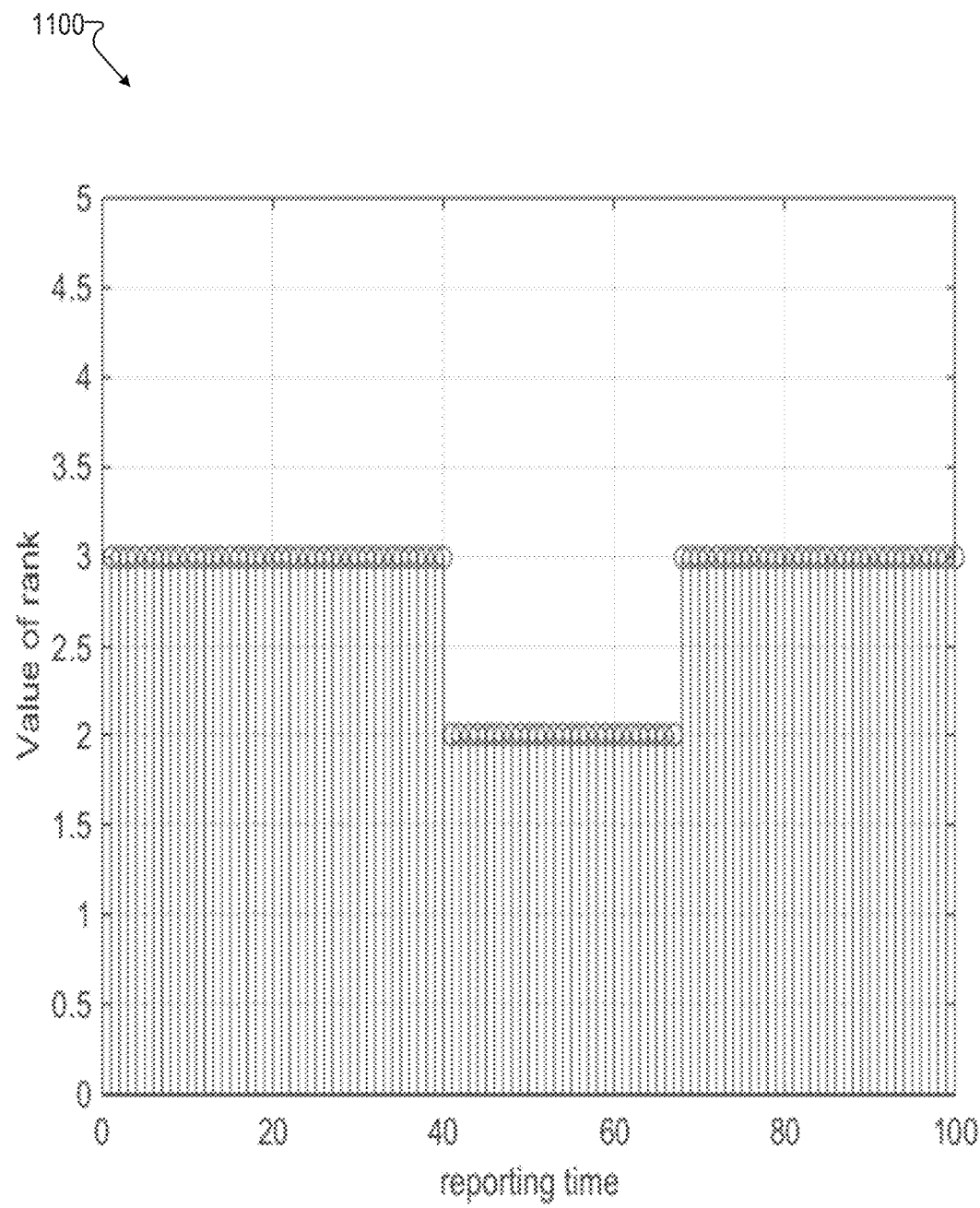
FIG. 11 illustrates an example graph of an instantaneous RI at geometry equal to 15 dB according to one or more embodiments.
Figure 12:
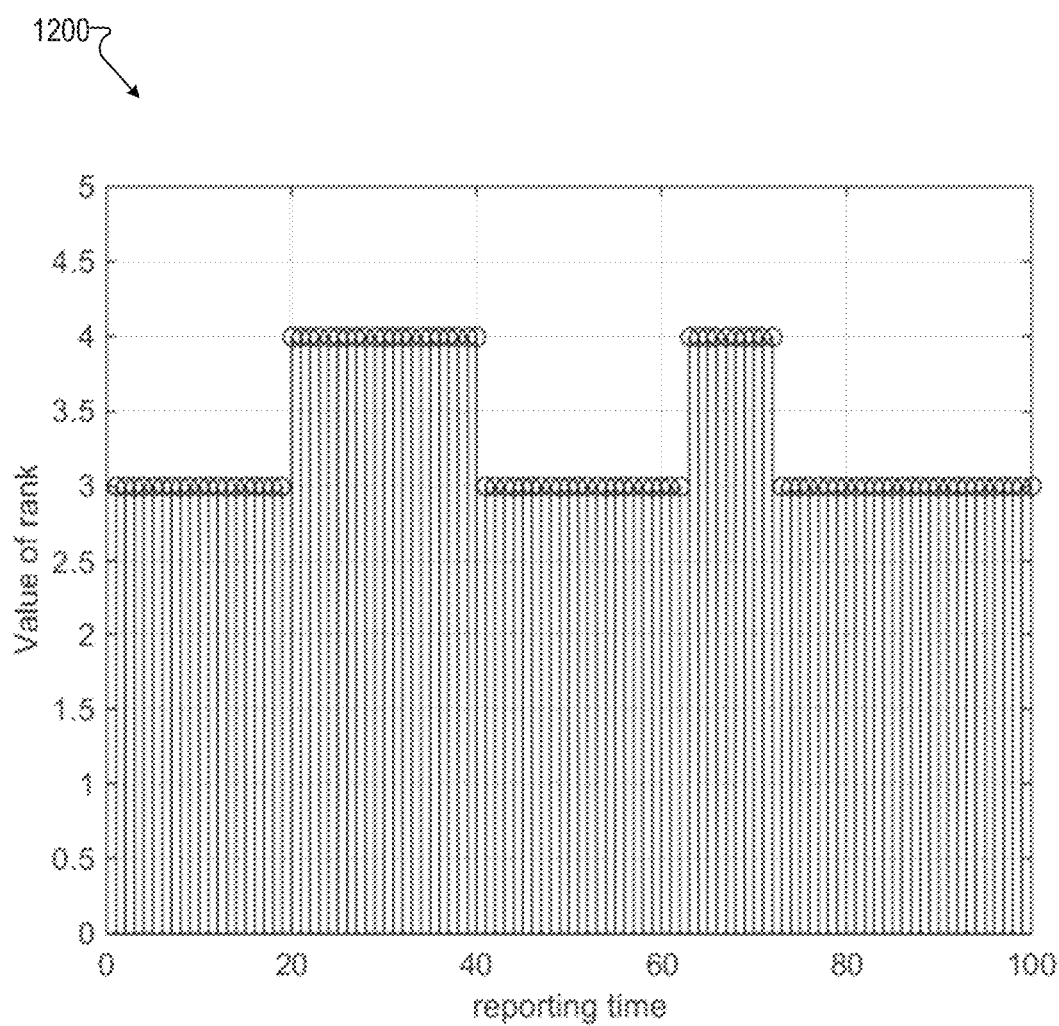
FIG. 12 illustrates an example graph of an instantaneous RI at geometry equal to 20 dB according to one or more embodiments.
Figure 13:
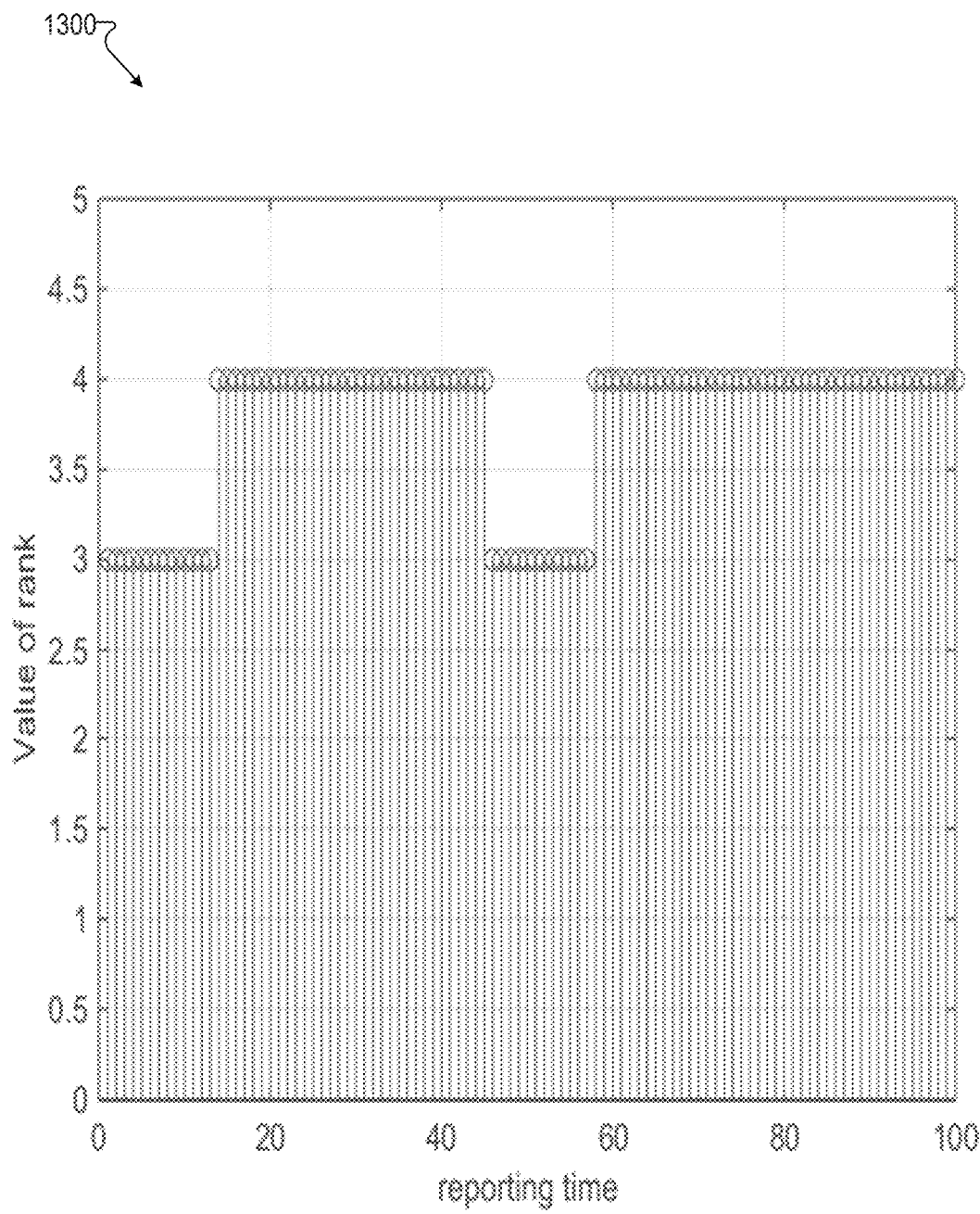
FIG. 13 illustrates an example graph of an instantaneous RI at geometry equal to 25 dB according to one or more embodiments.
Figure 14:
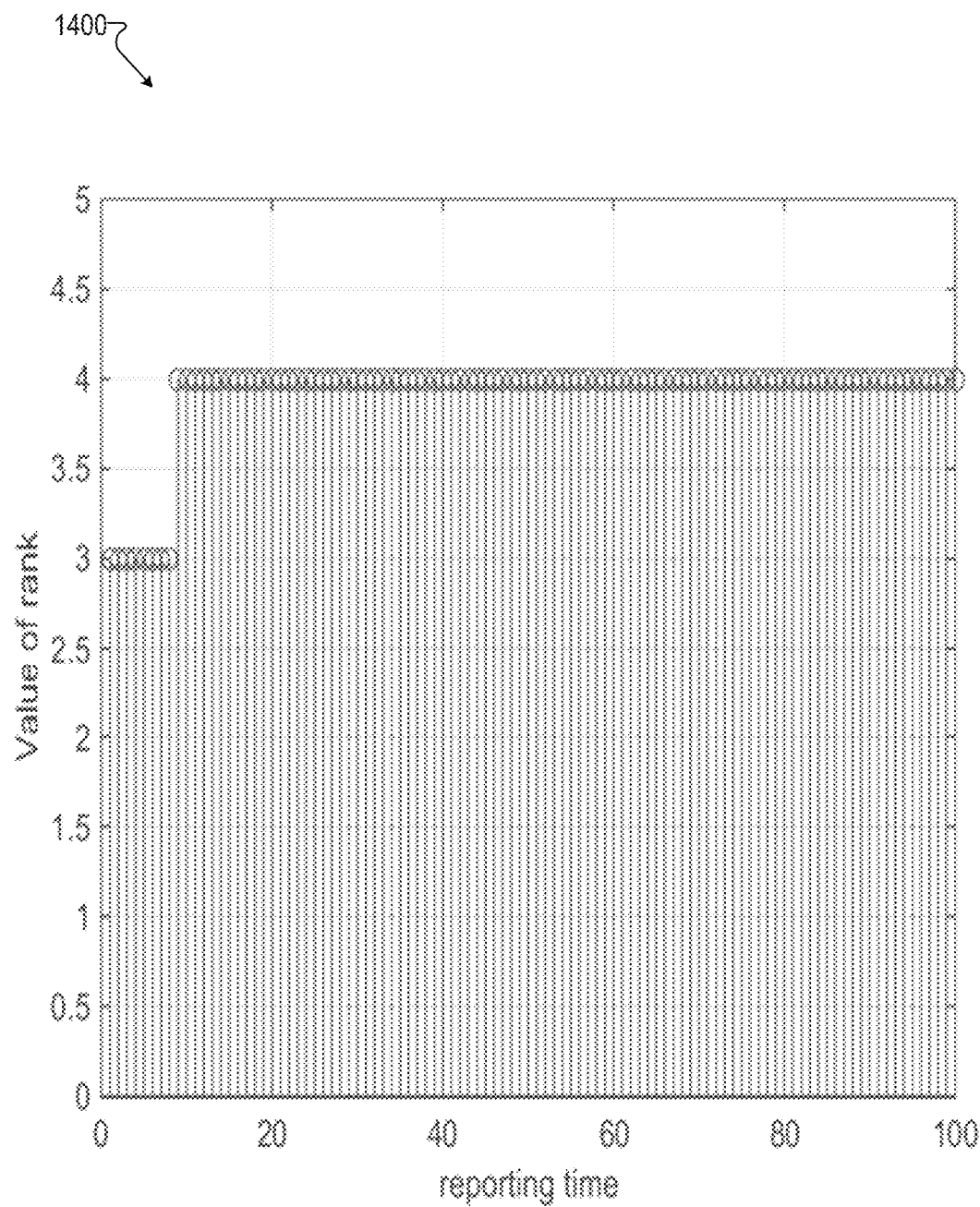
FIG. 14 illustrates an example graph of an instantaneous RI at geometry equal to 30 dB according to one or more embodiments.

Referring now to FIGS. 7-14, illustrated are example graphs of an instantaneous RI at various geometries between −5 dB to 30 dB (in increments of 5 dB) according to one or more embodiments. More specifically, graph 700 of FIG. 7 shows instantaneous RI at geometry equal to −5 dB, graph 800 of FIG. 8 shows instantaneous RI at geometry equal to 0 dB, graph 900 of FIG. 9 shows instantaneous RI at geometry equal to 5 dB, graph 1000 of FIG. 10 shows instantaneous RI at geometry equal to 10 dB, graph 1100 of FIG. 11 shows instantaneous RI at geometry equal to 15 dB, graph 1200 of FIG. 12 shows instantaneous RI at geometry equal to 20 dB, graph 1300 of FIG. 13 shows instantaneous RI at geometry equal to 25 dB, and graph 1400 of FIG. 14 shows instantaneous RI at geometry equal to 30 dB.

Figure 15:
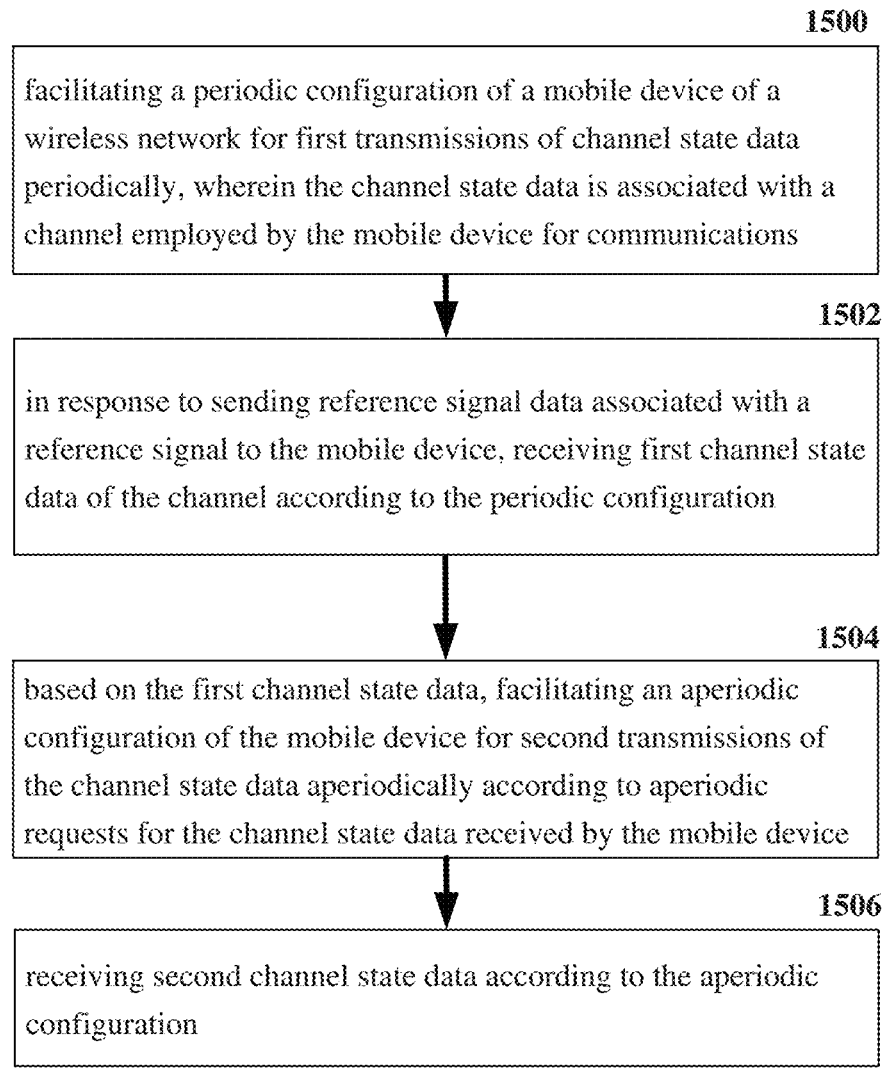
FIG. 15 illustrates is a first example flow diagram for a method for reducing UE computational complexity for a 5G network according to one or more embodiments.

Referring now to FIG. 15, illustrated is an example schematic system block diagram of an example flow diagram for a method for reducing UE computational complexity for a 5G network according to one or more embodiments. The method can comprise, at 1500, facilitating (e.g., via the network node 104) a periodic configuration of a mobile device (e.g., UE 102) of a wireless network for first transmissions of channel state data periodically, wherein the channel state data is associated with a channel employed by the mobile device (e.g., UE 102) for communications. At 1502, in response to sending (e.g., via the network node 104) reference signal data associated with a reference signal to the mobile device (e.g., UE 102), the method can comprise receiving (e.g., via network node 104) first channel state data of the channel according to the periodic configuration.

The first channel state data can comprise channel quality indicator data representative of a channel quality of the channel employed by the mobile device. The first channel state data can comprise precoding matrix index data associated with a precoding matrix associated with the channel employed by the mobile device. Alternatively, the first channel state data can comprise precoding matrix index data associated with multiple precoding matrices associated with sub bands of the channel employed by the mobile device. Further, the first channel state data can comprise rank data associated with a channel rank of the channel employed by the mobile device.

At 1504, based on the first channel state data, the method can facilitate (e.g., via the network node 104) an aperiodic configuration of the mobile device (e.g., UE 102) for second transmissions of the channel state data aperiodically according to aperiodic requests for the channel state data received by the mobile device (e.g., UE 102). The facilitating the aperiodic configuration can comprise using ranking information from the first channel state data to facilitate a reduction in a number of values of a codebook data structure of the mobile device over which the mobile device searches in determining channel state information for the channel to apply to the second transmissions. For instance, the facilitating the aperiodic configuration comprises, based on the first channel state data, determining a parameter for a downlink transmission via a data channel to the mobile device. Furthermore, at 1506, the method can comprise receiving (e.g., via network node 104) second channel state data according to the aperiodic configuration.

Figure 16:
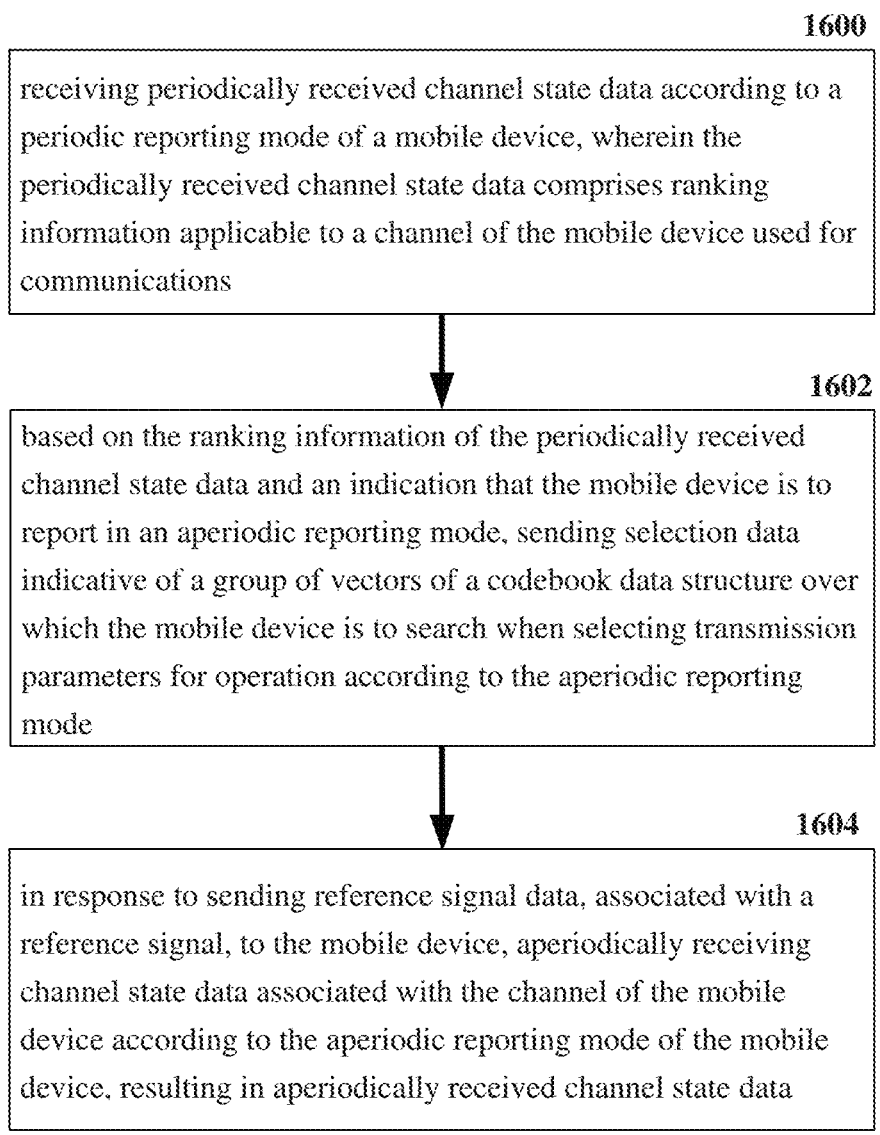
FIG. 16 illustrates is a second example flow diagram for a method for reducing UE computational complexity for a 5G network according to one or more embodiments.

FIG. 16 illustrates is another example flow diagram for a method for reducing UE computational complexity for a 5G network according to one or more embodiments, e.g., as might be implemented by a system comprising a processor and a memory that stores executable instructions that, when executed by the processor, facilitate performance of operations. Such operations can comprise, as shown at 1600, receiving periodically received channel state data according to a periodic reporting mode of a mobile device, wherein the periodically received channel state data comprises ranking information applicable to a channel of the mobile device used for communications. The operations can further comprise, at 1602, based on the ranking information of the periodically received channel state data and an indication that the mobile device is to report in an aperiodic reporting mode, sending selection data indicative of a group of vectors of a codebook data structure over which the mobile device is to search when selecting transmission parameters for operation according to the aperiodic reporting mode. The sending the selection data can comprise sending the selection data via channel rank data, associated with the channel, to the mobile device using dynamic signaling via a downlink control channel.

In this regard, the group of vectors of which the selection data is indicative can be the group of vectors of the codebook data structure that comprise ranks that satisfy a defined function of a rank represented by the periodically received channel state data. For instance, the group of vectors can be the group of vectors of the codebook data structure that comprise the ranks that match the rank represented by the periodically received channel state data. Alternatively, the group of vectors can be the group of vectors of the codebook data structure that comprise the ranks that are within one rank from the rank represented by the periodically received channel state data. Furthermore, the group of vectors can be the group of vectors of the codebook data structure that comprise first ranks that satisfy a defined function of a rank represented by the periodically received channel state data or second ranks using higher layer signaling.

The operations can further comprise, at 1604, in response to sending reference signal data, associated with a reference signal, to the mobile device, aperiodically receiving channel state data associated with the channel of the mobile device according to the aperiodic reporting mode of the mobile device, resulting in aperiodically received channel state data.

The operations can also comprise, based on the periodically received channel state data, generating the selection data comprising generating a codebook subset restriction bitmap indicative of the group of vectors of the codebook data structure over which the mobile device is to search when selecting the transmission parameters. In this regard, the codebook subset restriction bitmap can be a first codebook subset restriction bitmap used for the aperiodic reporting mode, the group of vectors can be a first group of vectors, and the transmission parameters can be first transmission parameters used for the aperiodic reporting mode, and wherein the operations can further comprise generating a second codebook subset restriction bitmap indicative of a second group of vectors of the codebook data structure over which the mobile device is to search when selecting second transmission parameters according to the periodic reporting mode.

Figure 17:
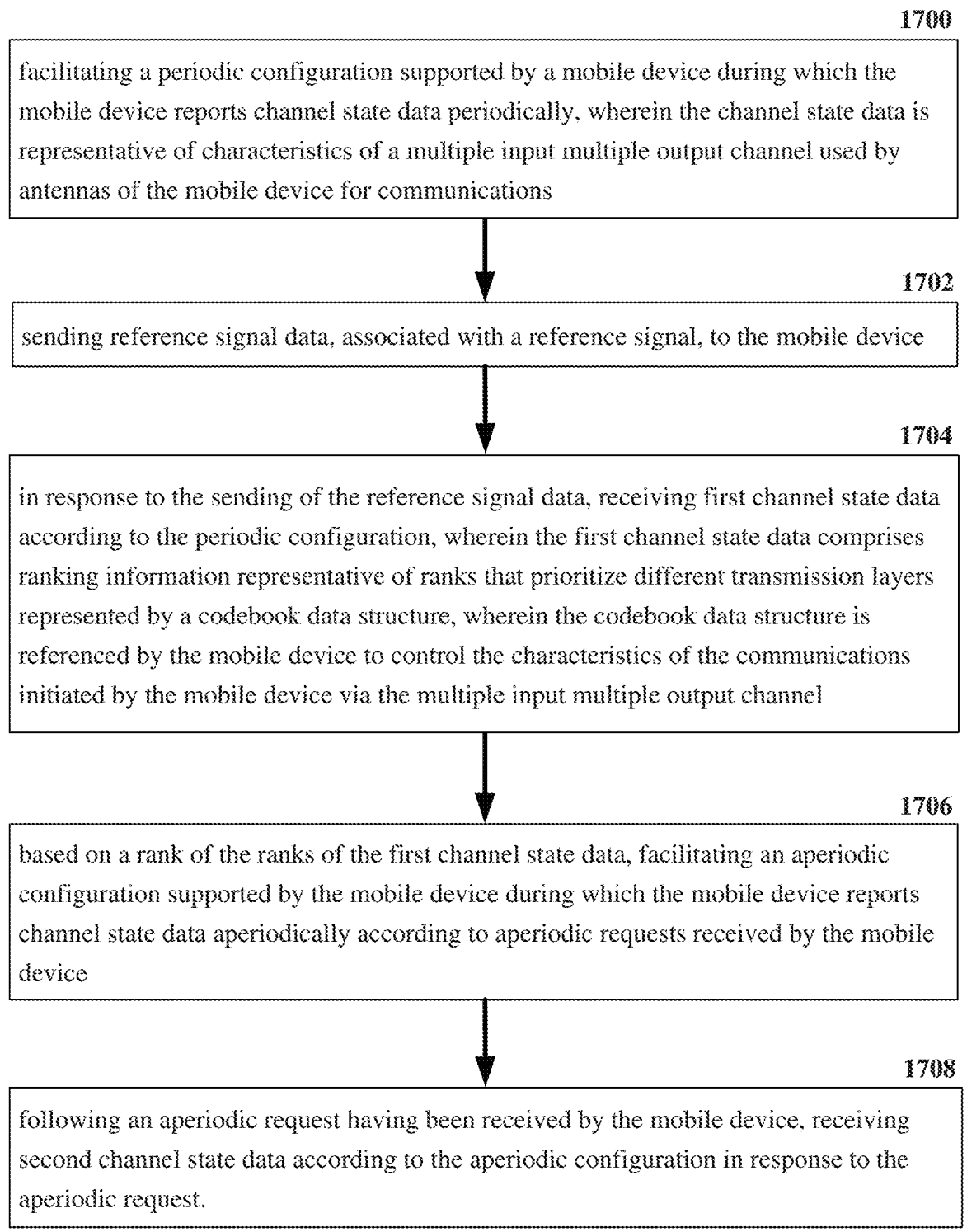
FIG. 17 illustrates is a third example flow diagram for a method for reducing UE computational complexity for a 5G network according to one or more embodiments.

FIG. 17 illustrates is a third example flow diagram for a method for reducing UE computational complexity for a 5G network according to one or more embodiments, such as might be implemented in a machine-readable storage medium, comprising executable instructions that, when executed by a processor, facilitate performance of operations. Such operations can comprise, at 1700, facilitating a periodic configuration supported by a mobile device during which the mobile device reports channel state data periodically, wherein the channel state data is representative of characteristics of a multiple input multiple output channel used by antennas of the mobile device for communications. At 1702, the operations can comprise sending reference signal data, associated with a reference signal, to the mobile device. At 1704, the operations can further comprise, in response to the sending of the reference signal data, receiving first channel state data according to the periodic configuration, wherein the first channel state data comprises ranking information representative of ranks that prioritize different transmission layers represented by a codebook data structure, wherein the codebook data structure is referenced by the mobile device to control the characteristics of the communications initiated by the mobile device via the multiple input multiple output channel. In an example embodiment, the receiving the first channel state data comprises receiving the first channel state data via a feedback channel between a wireless network device comprising the processor and the mobile device.

In addition, at 1706, the operations can comprise, based on a rank of the ranks of the first channel state data, facilitating an aperiodic configuration supported by the mobile device during which the mobile device reports channel state data aperiodically according to aperiodic requests received by the mobile device. At 1708, the operations can further comprise, following an aperiodic request having been received by the mobile device, receiving second channel state data according to the aperiodic configuration in response to the aperiodic request.

In the aperiodic configuration based on the rank, the mobile device can process a first group of the different transmission layers represented by the codebook data structure that match the rank but does not process a second group of the different transmission layers represented by the codebook data structure that do not match the rank. Alternatively, in the aperiodic configuration based on the rank, the mobile device can process a first group of the different transmission layers represented by the codebook data structure that are within one rank of the rank but not process a second group of the different transmission layers represented by the codebook data structure that are not within one rank of the rank. In one embodiment, the first channel state data further comprises precoding matrix index data associated with a precoding matrix further used to control the characteristics of the communications initiated by the mobile device via the multiple input multiple output channel, and the precoding matrix corresponds to a number of transmission antennas used in connection with the channel.

Figure 18:
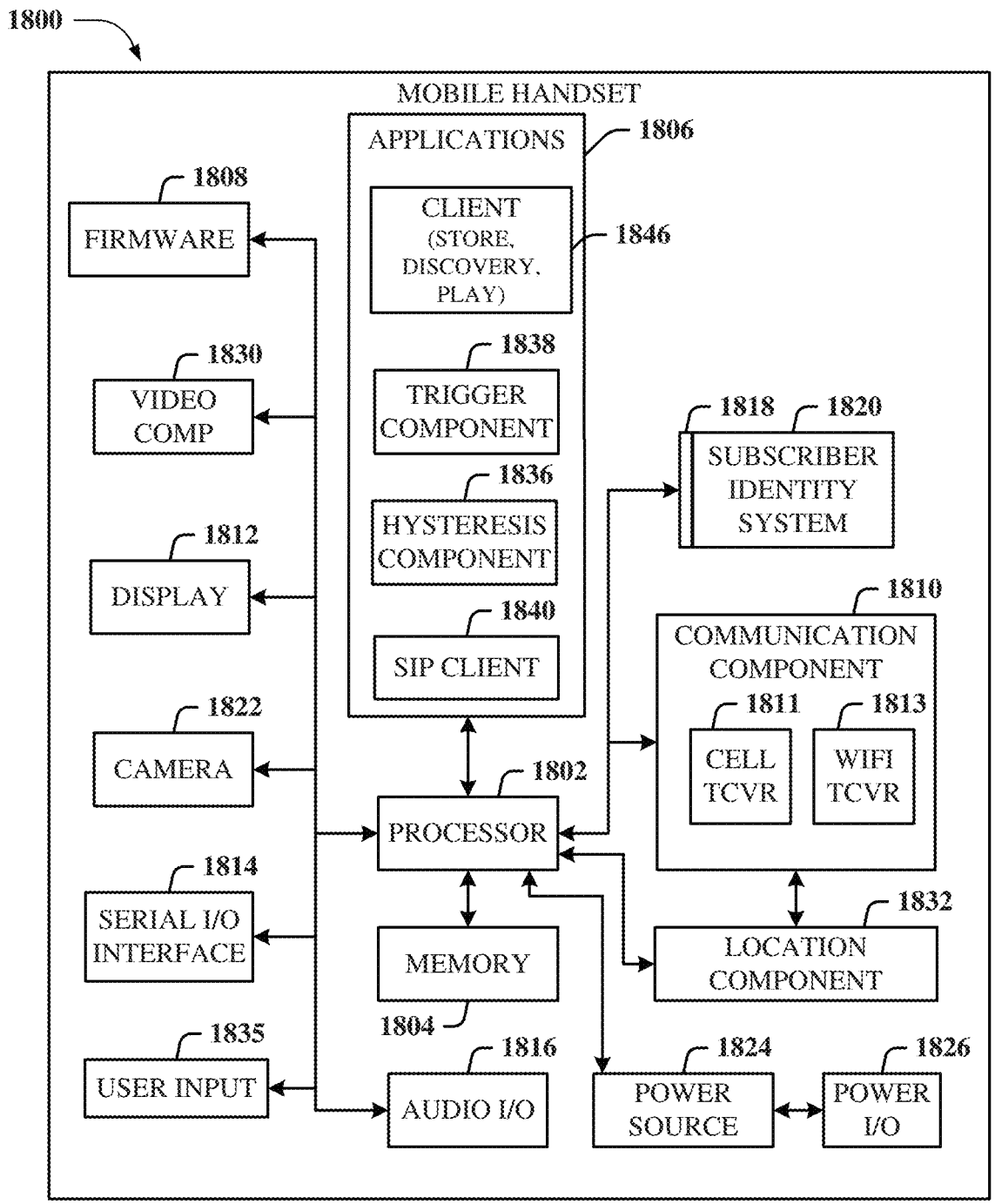
FIG. 18 illustrates an example block diagram of an example mobile handset operable to engage in a system architecture that facilitates secure wireless communication according to one or more embodiments described herein.

Referring now to FIG. 18, illustrated is a schematic block diagram of an exemplary end-user device such as a mobile device 1800 capable of connecting to a network in accordance with some embodiments described herein. Although a mobile handset 1800 is illustrated herein, it will be understood that other devices can be a mobile device, and that the mobile handset 1800 is merely illustrated to provide context for the embodiments of the various embodiments described herein. The following discussion is intended to provide a brief, general description of an example of a suitable environment 1800 in which the various embodiments can be implemented. While the description includes a general context of computer-executable instructions embodied on a machine-readable storage medium, those skilled in the art will recognize that the various embodiments also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically comprise a variety of machine-readable media. Machine-readable media can be any available media that can be accessed by the computer and comprises both volatile and non-volatile media, removable and non-removable media. By way of example and not limitation, computer-readable media can comprise computer storage media and communication media. Computer storage media can comprise volatile and/or non-volatile media, removable and/or non-removable media implemented in any method or technology for storage of information, such as computer-readable instructions, data structures, program modules or other data. Computer storage media can comprise, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and comprises any information delivery media. The term "modulated data signal" means a signal that has one or more of its characteristics set or changed in such a manner as to encode information in the signal. By way of example, and not limitation, communication media comprises wired media such as a wired network or direct-wired connection, and wireless media such as acoustic, RF, infrared and other wireless media. Combinations of the any of the above should also be included within the scope of computer-readable media.

The handset 1800 comprises a processor 1802 for controlling and processing all onboard operations and functions. A memory 1804 interfaces to the processor 1802 for storage of data and one or more applications 1806 (e.g., a video player software, user feedback component software, etc.). Other applications can comprise voice recognition of predetermined voice commands that facilitate initiation of the user feedback signals. The applications 1806 can be stored in the memory 1804 and/or in a firmware 1808, and executed by the processor 1802 from either or both the memory 1804 or/and the firmware 1808. The firmware 1808 can also store startup code for execution in initializing the handset 1800. A communications component 1810 interfaces to the processor 1802 to facilitate wired/wireless communication with external systems, e.g., cellular networks, VoIP networks, and so on. Here, the communications component 1810 can also comprise a suitable cellular transceiver 1811 (e.g., a GSM transceiver) and/or an unlicensed transceiver 1813 (e.g., Wi-Fi, WiMax) for corresponding signal communications. The handset 1800 can be a device such as a cellular telephone, a PDA with mobile communications capabilities, and messaging-centric devices. The communications component 1810 also facilitates communications reception from terrestrial radio networks (e.g., broadcast), digital satellite radio networks, and Internet-based radio services networks.

The handset 1800 comprises a display 1812 for displaying text, images, video, telephony functions (e.g., a Caller ID function), setup functions, and for user input. For example, the display 1812 can also be referred to as a "screen" that can accommodate the presentation of multimedia content (e.g., music metadata, messages, wallpaper, graphics, etc.). The display 1812 can also display videos and can facilitate the generation, editing and sharing of video quotes. A serial I/O interface 1814 is provided in communication with the processor 1802 to facilitate wired and/or wireless serial communications (e.g., USB, and/or IEEE 1394) through a hardwire connection, and other serial input devices (e.g., a keyboard, keypad, and mouse). This supports updating and troubleshooting the handset 1800, for example. Audio capabilities are provided with an audio I/O component 1816, which can comprise a speaker for the output of audio signals related to, for example, indication that the user pressed the proper key or key combination to initiate the user feedback signal. The audio I/O component 1816 also facilitates the input of audio signals through a microphone to record data and/or telephony voice data, and for inputting voice signals for telephone conversations.

The handset 1800 can comprise a slot interface 1818 for accommodating a SIC (Subscriber Identity Component) in the form factor of a card Subscriber Identity Module (SIM) or universal SIM 1820, and interfacing the SIM card 1820 with the processor 1802. However, it is to be appreciated that the SIM card 1820 can be manufactured into the handset 1800, and updated by downloading data and software.

The handset 1800 can process IP data traffic through the communication component 1810 to accommodate IP traffic from an IP network such as, for example, the Internet, a corporate intranet, a home network, a person area network, etc., through an ISP or broadband cable provider. Thus, VoIP traffic can be utilized by the handset 800 and IP-based multimedia content can be received in either an encoded or decoded format.

A video processing component 1822 (e.g., a camera) can be provided for decoding encoded multimedia content. The video processing component 1822 can aid in facilitating the generation, editing and sharing of video quotes. The handset 1800 also comprises a power source 1824 in the form of batteries and/or an AC power subsystem, which power source 1824 can interface to an external power system or charging equipment (not shown) by a power I/O component 1826.

The handset 1800 can also comprise a video component 1830 for processing video content received and, for recording and transmitting video content. For example, the video component 1830 can facilitate the generation, editing and sharing of video quotes. A location tracking component 1832 facilitates geographically locating the handset 1800. As described hereinabove, this can occur when the user initiates the feedback signal automatically or manually. A user input component 1834 facilitates the user initiating the quality feedback signal. The user input component 1834 can also facilitate the generation, editing and sharing of video quotes. The user input component 1834 can comprise such conventional input device technologies such as a keypad, keyboard, mouse, stylus pen, and/or touch screen, for example.

Referring again to the applications 1806, a hysteresis component 1836 facilitates the analysis and processing of hysteresis data, which is utilized to determine when to associate with the access point. A software trigger component 1838 can be provided that facilitates triggering of the hysteresis component 1838 when the Wi-Fi transceiver 1813 detects the beacon of the access point. A SIP client 1840 enables the handset 1800 to support SIP protocols and register the subscriber with the SIP registrar server. The applications 1806 can also comprise a client 1842 that provides at least the capability of discovery, play and store of multimedia content, for example, music.

The handset 1800, as indicated above related to the communications component 810, comprises an indoor network radio transceiver 1813 (e.g., Wi-Fi transceiver). This function supports the indoor radio link, such as IEEE 802.11, for the dual-mode GSM handset 1800. The handset 1800 can accommodate at least satellite radio services through a handset that can combine wireless voice and digital radio chipsets into a single handheld device.

Figure 19:
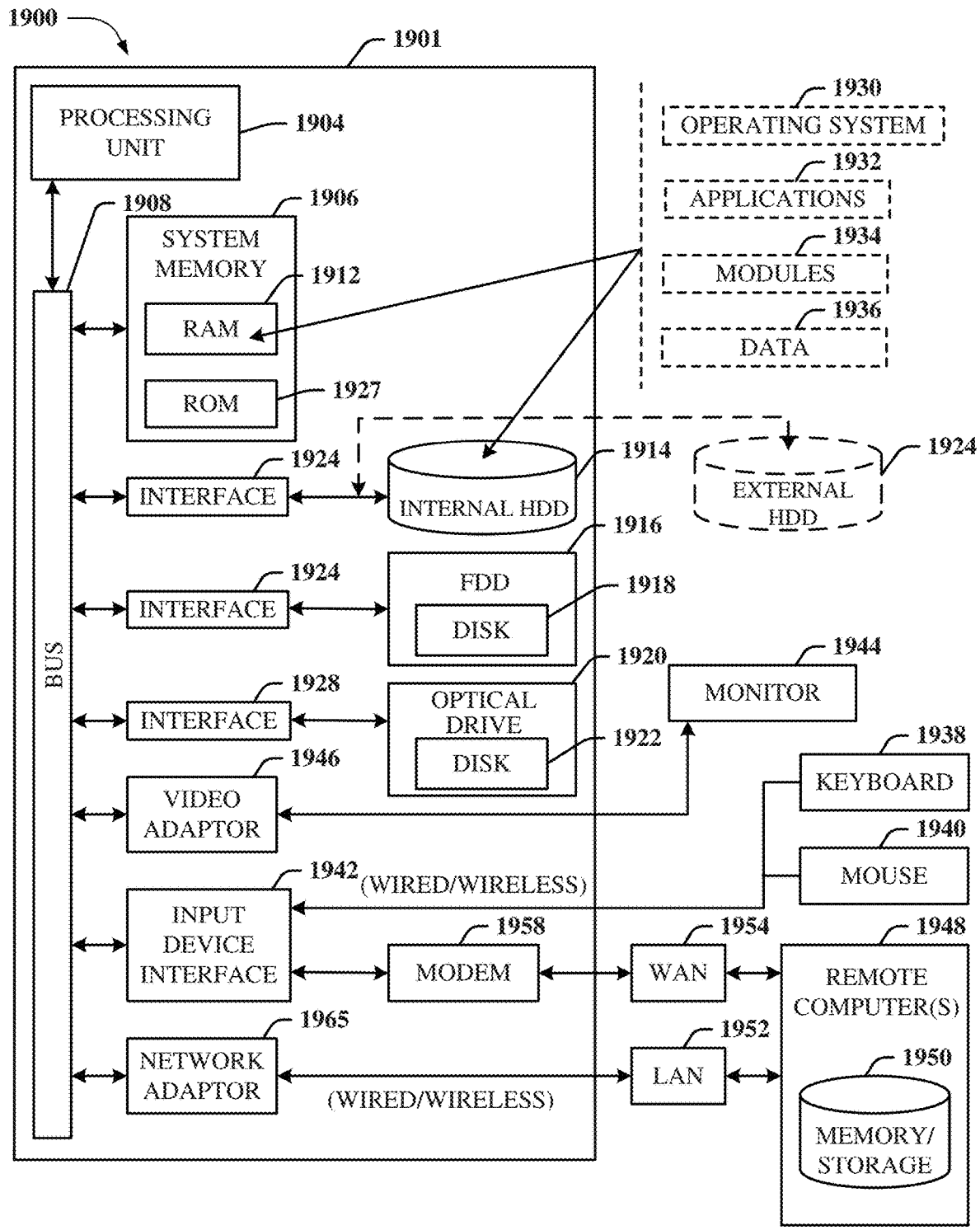
FIG. 19 illustrates an example block diagram of an example computer operable to engage in a system architecture that facilitates secure wireless communication according to one or more embodiments described herein.

Referring now to FIG. 19, there is illustrated a block diagram of a computer 1900 operable to execute a system architecture that facilitates establishing a transaction between an entity and a third party. The computer 1900 can provide networking and communication capabilities between a wired or wireless communication network and a server (e.g., Microsoft server) and/or communication device. In order to provide additional context for various aspects thereof, FIG. 19 and the following discussion are intended to provide a brief, general description of a suitable computing environment in which the various aspects of the various embodiments can be implemented to facilitate the establishment of a transaction between an entity and a third party. While the description above is in the general context of computer-executable instructions that can run on one or more computers, those skilled in the art will recognize that the various embodiments also can be implemented in combination with other program modules and/or as a combination of hardware and software.

Generally, program modules comprise routines, programs, components, data structures, etc., that perform particular tasks or implement particular abstract data types. Moreover, those skilled in the art will appreciate that the inventive methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the various embodiments can also be practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media or communications media, which two terms are used herein differently from one another as follows.

Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference to FIG. 19, implementing various aspects described herein with regards to the end-user device can comprise a computer 1900, the computer 1900 comprising a processing unit 1904, a system memory 1906 and a system bus 1908. The system bus 1908 couples system components comprising, but not limited to, the system memory 1906 to the processing unit 1904. The processing unit 1904 can be any of various commercially available processors. Dual microprocessors and other multi processor architectures can also be employed as the processing unit 1904.

The system bus 1908 can be any of several types of bus structure that can further interconnect to a memory bus (with or without a memory controller), a peripheral bus, and a local bus using any of a variety of commercially available bus architectures. The system memory 1906 comprises read-only memory (ROM) 1927 and random access memory (RAM) 1912. A basic input/output system (BIOS) is stored in a non-volatile memory 1927 such as ROM, EPROM, EEPROM, which BIOS contains the basic routines that help to transfer information between elements within the computer 1900, such as during start-up. The RAM 1912 can also comprise a high-speed RAM such as static RAM for caching data.

The computer 1900 further comprises an internal hard disk drive (HDD) 1914 (e.g., EIDE, SATA), which internal hard disk drive 1914 can also be configured for external use in a suitable chassis (not shown), a magnetic floppy disk drive (FDD) 1916, (e.g., to read from or write to a removable diskette 1918) and an optical disk drive 1920, (e.g., reading a CD-ROM disk 1922 or, to read from or write to other high capacity optical media such as the DVD). The hard disk drive 1914, magnetic disk drive 1916 and optical disk drive 1920 can be connected to the system bus 1908 by a hard disk drive interface 1924, a magnetic disk drive interface 1926 and an optical drive interface 1928, respectively. The interface 1924 for external drive implementations comprises at least one or both of Universal Serial Bus (USB) and IEEE 1994 interface technologies. Other external drive connection technologies are within contemplation of the subject embodiments.

The drives and their associated computer-readable media provide nonvolatile storage of data, data structures, computer-executable instructions, and so forth. For the computer 1900 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1900, such as zip drives, magnetic cassettes, flash memory cards, cartridges, and the like, can also be used in the exemplary operating environment, and further, that any such media can contain computer-executable instructions for performing the methods of the disclosed embodiments.

A number of program modules can be stored in the drives and RAM 1912, comprising an operating system 1930, one or more application programs 1932, other program modules 1934 and program data 1936. All or portions of the operating system, applications, modules, and/or data can also be cached in the RAM 1912. It is to be appreciated that the various embodiments can be implemented with various commercially available operating systems or combinations of operating systems.

A user can enter commands and information into the computer 1900 through one or more wired/wireless input devices, e.g., a keyboard 1938 and a pointing device, such as a mouse 1940. Other input devices (not shown) may comprise a microphone, an IR remote control, a joystick, a game pad, a stylus pen, touch screen, or the like. These and other input devices are often connected to the processing unit 1904 through an input device interface 1942 that is coupled to the system bus 1908, but can be connected by other interfaces, such as a parallel port, an IEEE 2394 serial port, a game port, a USB port, an IR interface, etc.

A monitor 1944 or other type of display device is also connected to the system bus 1908 through an interface, such as a video adapter 1946. In addition to the monitor 1944, a computer 1900 typically comprises other peripheral output devices (not shown), such as speakers, printers, etc.

The computer 1900 can operate in a networked environment using logical connections by wired and/or wireless communications to one or more remote computers, such as a remote computer(s) 1948. The remote computer(s) 1948 can be a workstation, a server computer, a router, a personal computer, portable computer, microprocessor-based entertainment device, a peer device or other common network node, and typically comprises many or all of the elements described relative to the computer, although, for purposes of brevity, only a memory/storage device 1950 is illustrated. The logical connections depicted comprise wired/wireless connectivity to a local area network (LAN) 1952 and/or larger networks, e.g., a wide area network (WAN) 1954. Such LAN and WAN networking environments are commonplace in offices and companies, and facilitate enterprise-wide computer networks, such as intranets, all of which may connect to a global communications network, e.g., the Internet.

When used in a LAN networking environment, the computer 1900 is connected to the local network 1952 through a wired and/or wireless communication network interface or adapter 1956. The adapter 1956 may facilitate wired or wireless communication to the LAN 1952, which may also comprise a wireless access point disposed thereon for communicating with the wireless adapter 1956.

When used in a WAN networking environment, the computer 1900 can comprise a modem 1958, or is connected to a communications server on the WAN 1954, or has other means for establishing communications over the WAN 1954, such as by way of the Internet. The modem 1958, which can be internal or external and a wired or wireless device, is connected to the system bus 1908 through the input device interface 1942. In a networked environment, program modules depicted relative to the computer, or portions thereof, can be stored in the remote memory/storage device 1950. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This comprises at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

In general, it is common practice to configure the UE with periodic and aperiodic CSI reporting. However, with periodic and aperiodic CSI reporting, the UE computes RI too many times. For example, for each report, the UE computes RI/PMI/CQI. Finding PMI/RI for several antennas is highly complex and requires an exhaustive search over the codebook elements. It involves many computations and is difficult to implement with the increase in the number of transmit antennas.

For example in 4 Tx MIMO, the UE searches 64 precoding entities for finding the rank information and precoding index. This may drain UE battery life, increase power consumption, and/or consume more memory and processing units at the UE. Thusly, with the increase of the number of antennas, the codebook size grows. Hence, with the currently available hardware/software resources, within a limited time budget, finding rank information and the corresponding precoding matrix computation is highly complex.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding FIGs, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
in response to sending reference signal data, associated with a reference signal, to a mobile device, receiving, by a network device comprising a processor, first channel state data, associated with a channel employed by the mobile device, according to a periodic configuration of the mobile device for a first transmission of channel state data periodically;
based on the first channel state data, facilitating, by the network device, an aperiodic configuration of the mobile device for a second transmission of the channel state data aperiodically according to aperiodic requests for the channel state data received by the mobile device, wherein the facilitating the aperiodic configuration comprises using ranking information from the first channel state data to facilitate a reduction in a number of values of a codebook data structure of the mobile device over which the mobile device searches in determining channel state information for the channel to apply to the second transmission; and
receiving, by the network device, second channel state data according to the aperiodic configuration.

2. The method of claim 1, further comprising:
based on the first channel state data, determining, by the network device, a parameter for a downlink transmission via a data channel to the mobile device.

3. The method of claim 1, wherein the first channel state data comprises signal interference to noise ratio data representative of a signal interference experienced by the channel.

4. The method of claim 1, wherein the first channel state data comprises precoding matrix index data associated with a precoding matrix associated with the channel employed by the mobile device.

5. The method of claim 4, wherein the precoding matrix, associated with the precoding index data, corresponds to a number of transmission antennas used in connection with a multiple input multiple output channel.

6. The method of claim 1, wherein the first channel state data comprises precoding matrix index data associated with multiple precoding matrices associated with sub bands of the channel employed by the mobile device.

7. The method of claim 1, wherein the first channel state data comprises rank data associated with a channel rank of the channel employed by the mobile device.

8. A system, comprising:
a processor; and
a memory that stores executable instructions that, when executed by the processor, facilitate performance of operations, comprising:
based on ranking information associated with periodically received channel state data and an indication that a mobile device is to report in an aperiodic reporting mode, sending selection data indicative of a group of vectors of a codebook data structure over which the mobile device is to search when selecting transmission parameters for operation according to an aperiodic reporting mode of the mobile device; and
in response to sending reference signal data, associated with a reference signal, to the mobile device, aperiodically receiving the channel state data associated with a channel of the mobile device according to the aperiodic reporting mode of the mobile device, resulting in aperiodically received channel state data.

9. The system of claim 8, wherein the group of vectors is the group of vectors of the codebook data structure comprising ranks that satisfy a defined function of a rank represented by the periodically received channel state data.

10. The system of claim 9, wherein the group of vectors comprises the group of vectors of the codebook data structure comprising the ranks that match the rank represented by the periodically received channel state data.

11. The system of claim 9, wherein the group of vectors comprises the group of vectors of the codebook data structure comprising the ranks that are within one rank from the rank represented by the periodically received channel state data.

12. The system of claim 8, wherein the group of vectors, of which the selection data is indicative, comprises the group of vectors of the codebook data structure comprising first ranks that satisfy a defined function of a rank represented by the periodically received channel state data or second ranks using higher layer signaling.

13. The system of claim 8, wherein the operations further comprise:
based on the periodically received channel state data, generating a codebook subset restriction bitmap indicative of the group of vectors of the codebook data structure over which the mobile device is to search when selecting the transmission parameters.

14. The system of claim 8, wherein the sending the selection data comprises sending the selection data via channel rank data, associated with the channel, to the mobile device using dynamic signaling via a downlink control channel.

15. The system of claim 14, wherein the dynamic signaling is sent via a downlink control channel associated with the mobile device.

16. A machine-readable storage medium, comprising executable instructions that, when executed by a processor, facilitate performance of operations, comprising:
- in response to sending reference signal data to a mobile device, receiving first channel state data according to a periodic configuration supported by the mobile device, wherein the first channel state data comprises ranking data representative of ranks that prioritize different transmission layers represented by a codebook data structure;
- based on a rank of the ranks of the first channel state data, facilitating an aperiodic configuration supported by the mobile device during which the mobile device reports channel state data aperiodically according to aperiodic requests received by the mobile device; and
- following an aperiodic request having been received by the mobile device, receiving second channel state data according to the aperiodic configuration in response to the aperiodic request.

17. The machine-readable storage medium of claim 16, wherein the codebook data structure is referenced by the mobile device to control a characteristic of a communication initiated by the mobile device via a multiple input multiple output channel.

18. The machine-readable storage medium of claim 16, wherein the operations further comprise:
- facilitating the periodic configuration supported by the mobile device during which the mobile device reports the channel state data periodically.

19. The machine-readable storage medium of claim 18, wherein the operations further comprise:
- in response to the facilitating the periodic configuration supported by the mobile device, facilitating sending reference signal data, associated with a reference signal, to the mobile device.

20. The machine-readable storage medium of claim 16, wherein the channel state data is representative of characteristics of a multiple input multiple output channel used by antennas of the mobile device for communications.

* * * * *